US012282470B2

(12) United States Patent
Helland et al.

(10) Patent No.: US 12,282,470 B2
(45) Date of Patent: Apr. 22, 2025

(54) SKIP-LIST CHECKPOINT CREATION

(71) Applicant: Salesforce, Inc., San Francisco, CA (US)

(72) Inventors: Patrick James Helland, San Rafael, CA (US); James E. Mace, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 34 days.

(21) Appl. No.: 17/938,083

(22) Filed: Oct. 5, 2022

(65) Prior Publication Data

US 2023/0244649 A1 Aug. 3, 2023

Related U.S. Application Data

(60) Provisional application No. 63/267,377, filed on Jan. 31, 2022.

(51) Int. Cl.
*G06F 16/22* (2019.01)
(52) U.S. Cl.
CPC ...... *G06F 16/2255* (2019.01); *G06F 16/2272* (2019.01)
(58) Field of Classification Search
None
See application file for complete search history.

(56) References Cited

U.S. PATENT DOCUMENTS

| | | | |
|---|---|---|---|
| 5,761,501 A * | 6/1998 | Lubbers | G06F 16/902 711/143 |
| 8,683,262 B1 * | 3/2014 | Subbiah | G06F 16/90 714/19 |
| 10,158,642 B2 | 12/2018 | Jujjuri et al. | |
| 10,241,896 B2 | 3/2019 | Martin et al. | |
| 10,346,386 B2 | 7/2019 | Chatterjee et al. | |
| 10,592,353 B2 | 3/2020 | Martin et al. | |
| 10,621,071 B2 | 4/2020 | Martin et al. | |
| 10,691,696 B2 | 6/2020 | Helland et al. | |
| 2016/0117318 A1 | 4/2016 | Helland | |
| 2018/0218023 A1 | 8/2018 | Fanghaenel et al. | |
| 2019/0163613 A1 | 5/2019 | Martin et al. | |
| 2019/0278762 A1 | 9/2019 | Chatterjee et al. | |
| 2020/0159628 A1 | 5/2020 | Martin et al. | |
| 2020/0201745 A1 | 6/2020 | Martin et al. | |
| 2020/0320083 A1 | 10/2020 | Helland et al. | |
| 2022/0129422 A1 * | 4/2022 | Ke | G06F 16/122 |

* cited by examiner

*Primary Examiner* — Giuseppi Giuliani
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to backing up skip list data structures to facilitate a subsequent recovery. In various embodiments, a computing system creates a checkpoint of a skip list including a plurality of key-value records that include pointers to others of the plurality of key-value records. Creating the checkpoint includes scanning the skip list to identify ones of the plurality of key-value records that are relevant to the checkpoint and storing the identified key-value records in a storage such that the identified key-value records include pointers modified to exclude ones of the plurality of key-value records that are not relevant to the checkpoint. The computing system can then recover the skip list based on the created checkpoint.

20 Claims, 17 Drawing Sheets

SKIP-LIST CHECKPOINT CREATION

The present application claims priority to U.S. Prov. Appl. No. 63/267,377, filed Jan. 31, 2022, which is incorporated by reference herein in its entirety.

BACKGROUND

Technical Field

This disclosure relates generally to data storage, and, more specifically, to manipulating a skip list data structure.

Description of the Related Art

In the computer science field, various complex data structures have been developed to facilitate the storage of information. These data structures are often created using multiple pointers to join a collection of records together. When designing a complex structure, a developer is often weighing concerns related to the complexities of inserting and retrieving information as well as the overall data structure size. A skip list is one example of a more complex data structure, which can be popular as it can maintain large data sets while still offering up to O(log n) insertion complexity and up to O(log n) search complexity. In this type of data structure, records may be sorted based on key order and associated using a linked hierarchy of data record sequences, with each successive sequence skipping over fewer elements than the previous sequence. This linked hierarchy is implemented using varying heights of pointer towers such that, within a given a tower, pointers may be arranged based on the numbers of skipped-over records. This ability to skip over records when the skip list is traversed may allow a given record to be located more quickly than scanning through the records sequentially.

DETAILED DESCRIPTION

Figure 1:
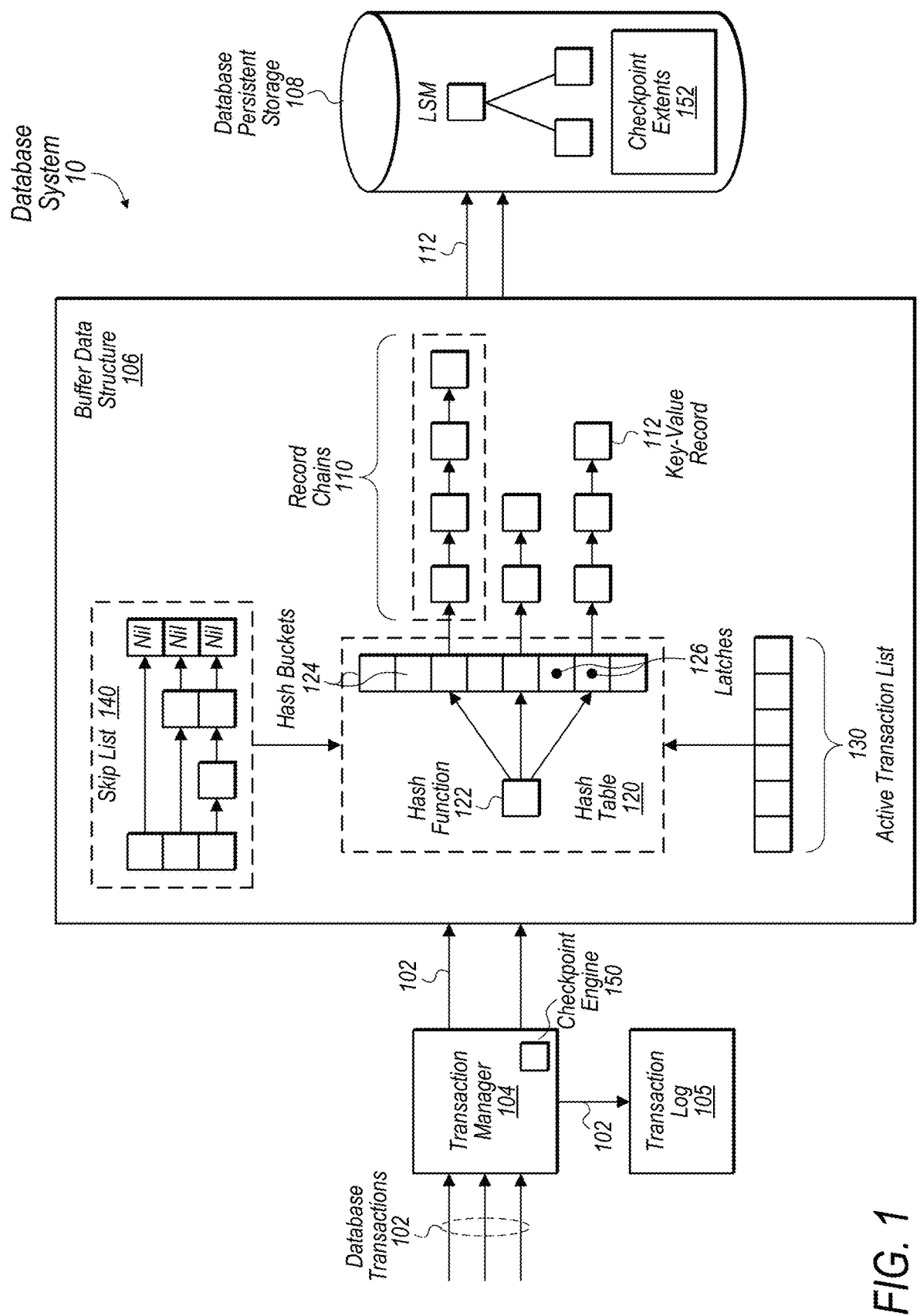
FIG. 1 is a block diagram illustrating one embodiment of a database system that uses a skip list within a buffer data structure to process concurrent database transactions.

In some instances, skip lists may be used to maintain large quantities of information that is frequently manipulated. For example, as will be described below in further detail, a database system may use a buffer data structure to store data of active database transactions until the database transactions can be committed and their data flushed to a persistent storage of the database system. The buffer data structure may include a skip list data structure that enables efficient storage and lookup of transaction records in key order.

Assembling a skip list having large quantities of information (e.g., 200,000,000 key-value records at a given time in one embodiment of the exemplary database system) however, can be resource intensive as each record insertion can include multiple memory access. A system crash that results in loss or damage to the skip list can therefore cause a significant performance hit. While a database system could attempt to periodically copy the entire skip list to facilitate a recovery, this approach may result in significant storage consumption as multiple duplicate sets of the same data may be stored. Furthermore, it may be difficult to correctly copy an entire skip list while large numbers of record insertions and removals are currently being performed.

The present disclosure describes embodiments in which a more efficient algorithm is used to back up/checkpoint a skip list in order to facilitate a subsequent recovery of the skip list. As will be described below, checkpoints of a skip list can be periodically created in a manner that preserves the structure of the skip list (e.g., the pointers making up the skip list's towers) and thus allows the skip list to be recovered without having to perform a record insertion for every record in the skip list. Furthermore, incremental checkpoints may be created that include only those records that were recently added to the skip list in order to avoid duplicating key-value records belonging to earlier checkpoints. In various embodiments, creating a checkpoint in this manner can include scanning the skip list to identify key-value records that are relevant to the current checkpoint being created as well as records to exclude from the checkpoint. In some embodiments in which a database system is using the checkpoint algorithm, relevant records can include those of committed database transactions that have yet to be flushed to a persistent storage and that do not belong to earlier created checkpoints. As these records are identified and copied for preservation, pointers in some copied records may be modified to exclude records that are not relevant to the checkpoint. For example, if a record has been flushed to persistent storage or is associated with later checkpoint, its contents may not need to be backed up as part of the current checkpoint being created. To account for this record's absence, copied records currently pointing to this record may have their pointers modified to reflect this record not being present during a subsequent recovery from this checkpoint. The relevant records (including those with modified pointers) may then be stored in a persistent storage that can later be accessed to facilitate a skip list recovery. Because the structure of the skip list has been preserved and updated to account for records that are not relevant to a given checkpoint, this skip list can be recovered without having to perform a tedious reconstruction of the skip list's structure by reinserting every record using skip list insertions that rely on traversing the skip list. Furthermore, preserving the skip list structure in this manner can also allow multiple portions of the skip list to be reassembled in parallel using currently executing threads.

The present disclosure begins with a discussion of a database system in conjunction with FIGS. 1-4, which may maintain a skip list and use the skip-list checkpoint algorithm mentioned above. This database system, however, is given merely as an exemplary use case as the checkpointing algorithm may have broader applications than database systems. An exemplary skip list is discussed in conjunction with FIG. 5. An algorithm for inserting a record into a skip list is then discussed with respect to FIG. 6. An algorithm for checkpointing a skip list is discussed with respect to FIGS. 7-12. Lastly, methods and exemplary computing systems are discussed with respect to FIGS. 13A-15.

Turning now to FIG. 1, a block diagram of a database system 10 is depicted. In illustrated embodiment, database system 10 includes a transaction manager 104, transaction log 105, buffer data structure 106, and a database persistent storage 108. As shown, buffer data structure 106 includes multiple record chains 110, hash table 120, active transaction list 130, and skip list 140. Record chains 110 include key-value records 112. Hash table 120 includes a hash function 122 and an array of a hash buckets 124, each including a latch 126. (As used herein, the term "latch," "lock," and "semaphore" are used generally to refer to a data structure that controls access to a resource shared among multiple potential consumers.) In the illustrated embodiment, manager 104 also includes a checkpoint engine 150. In some embodiments, database system 10 may be implemented differently than shown. For example, in some embodiments, buffer data structure 106 may include more (or less) structures. Although some structures 110, 120, 130, and 140 are depicted separately for illustration purposes, in some embodiments, structures 110, 120, 130, and/or 140 may be intertwined. For example, skip list 140 may be implemented by adding pointers within key-value records 112 in record chains 110.

Transaction manager 104, in one embodiment, includes program instructions that are executable to process received database transactions 102. In general, transactions 102 may be issued to read or write data to a database and may be received from any of various sources such as one or more client devices, application servers, software executing on database system 10, etc. As will be described in greater detail below, this processing may entail manager 104 initially storing records 112 for key-value pairs of transactions 102 in transaction log 105 and in buffer data structure 106 until the records 112 can be flushed to the persistent storage 108. Accordingly, various functionality described below with respect to buffer data structure 106 may be implemented by transaction manager 104 such as adding key-value records 112 to record chains 110, facilitating acquisition of hash-bucket latches 126 for transactions 102, modifications to active transaction list 130 and skip list 140, etc.

Transaction log 105, in one embodiment, maintains a history of changes made to database system 10 over time by transactions 102. As transactions 102 are received, transaction manager 104 may record their information in log 105 including their corresponding key-value records 112. If a system failure subsequently occurs, transaction manager 104 may replay log 105 from a position prior to the failure in order to roll back any uncommitted transactions 102 and restore database system 10 to a consistent state before resuming operation. In various embodiments, checkpoint engine 150 discussed below may replay transaction log 105 to facilitate recovery of skip list 140.

Buffer data structure 106, in one embodiment, is a data structure that buffers key-value pairs for active transactions until the transactions commit. As will be described below, buffer data structure 106 is structured in a manner that allows for quick insertion of key-value pairs, which can be performed concurrently in some instances allowing for high volumes of transactions to be processed efficiently. Still further, buffer data structure 106 may reside in a local memory allowing for faster reads and writes than persistent storage 108 where the data resides long term. In various embodiments, buffer data structure 106 allows concurrent modifications to be performed to it for different transactions 102, but provides a concurrency control mechanism via hash-bucket latches 126 for data within buffer data structure 106. In some embodiments, committed transaction data is asynchronously flushed from buffer data structure 106 to persistent storage 108. That is, rather than perform a flush for each transaction 102's data upon its commitment, a flush is performed periodically for multiple committed transactions 102. For example, in one embodiment, transaction manager 104 initiates a flush to database persistent storage 108 in response to buffer data structure 106 satisfying a particular size threshold.

Database system 10 may implement to any suitable form of database implementation. In some embodiments, the database is a non-relational database that is implemented using a log-structured merge (LSM) tree for persistent storage. In some embodiments, layers of the LSM tree may be distributed across multiple physical computer systems providing persistent storage. In some embodiments, these computers systems are cluster nodes of a computer cluster that provides a cloud-based system accessible to multiple clients. In some embodiments, the database may be part of a software as a service (SaaS) model; in other embodiments, the database may be directly operated by a user.

As noted above, when transaction manager 104 stores a key-value pair for an active transaction 102 in buffer data structure 106, a corresponding key-value record 112 may be created that includes the value and the key. If multiple transactions 102 attempt to write values associated with the same key, key-value records 112 may be generated for each value and linked to together to form a record chain 110 corresponding to the key. For example, if a user has withdrawn a first amount from a bank account resulting in a first database transaction 102 and then a second amount resulting in a second database transaction 102, a record chain 110 corresponding to an account-balance key may have two key-value records 112 reflecting those withdrawals. In various embodiments, each record 112 includes a transaction identifier (e.g., a transaction sequence number) specifying its associated transaction 102; records 112 may also be organized in a record chain 110 based on the ordering in which the transactions 102 are received. For example, as described below with respect to FIG. 2, record chains 110 may be implemented using linked lists such that a new record 112 is inserted at the head of the linked list and migrates to the tail as newer records 112 are created and older ones are flushed to database persistent storage 108. To facilitate quick access to key-value records 112, record chains 110 are appended to hash buckets 124 of hash table 120.

Hash table 120, in one embodiment, is a data structure that allows constant-time lookups of record chains 110 based on given a key. That is, when a key is received, hash table 120 is indexed into by applying hash function 122 to the key to produce the appropriate index value for the hash bucket 124 corresponding to the key. The direct pointer in the hash bucket 124 may then be referenced to obtain to the record chain 110. Being able to perform constant-time lookups may significantly reduce the time consumed to read key-value records 112, write records 112, or perform key probes (i.e., determining whether a key has a key-value record 112 present in buffer data structure 106).

As noted above, in various embodiments, each hash bucket 124 includes a respective latch 126 that controls access to its record chain 110. Accordingly, when a transaction is attempting to read or write a value associated with a particular key, the key may be used to index into hash table 120 and acquire the latch 126 corresponding to the key's associated hash bucket 124 before reading or writing is performed. If a latch 126 cannot be acquired for a database transaction 102, processing the database transaction 102 may be delayed until the latch 126 is released. In some embodiments, latches 126 may have one of three possible states: available, shared acquired, and exclusively acquired. If no transaction 102 is currently accessing a record chain 110, its latch 126 is available for acquiring. If a transaction 102 is performing a read of a key-value record 112, the latch 126 may be acquired in a shared state—meaning that other transactions 102 can also acquire the latch 126 as long as they are also performing a read (i.e., not attempting to modify a record 112 while it is also being read). If a transaction 102 is performing a write, however, the latch 126 is acquired for the transaction 102 in an exclusive state—meaning no other transaction 102 may acquire the latch 126 until it is released. Accordingly, if two transactions 102 are attempting to perform writes for the same key, the later transaction is delayed until the former completes its write operation and releases the latch 126. If a transaction 102 is attempting to access multiple key-value pairs, latches 126 may be acquired in ascending order of buckets 124 to prevent deadlock. Although acquisition of latches 126 may be discussed primarily with respect to read and write operations, latches 126 may also be acquired when performing other operations such as defragmentation, garbage collection, flushing records 112 to persistent storage 108, etc. In some embodiments, latches 126 may also serve as a concurrency control mechanism for active transaction list 130 and skip list 140.

Active transaction list 130, in one embodiment, is a data structure that tracks various metadata for active transactions 102. In various embodiments, the metadata for a given transaction 102 includes a transaction identifier for the transaction 102 and one or more pointers usable to access records 112 associated with the transaction 102. In doing so, list 130 enables a transaction 102's records 112 to be identified based on its transaction identifier, which may be helpful when, for example, determining which records 112 should be removed if the transaction 102 is being rolled back. The metadata may also include an indication of whether a transaction is active or committed, which may be used to determine if its records 112 can be marked for flushing to database persistent storage 108.

Skip list 140, in one embodiment, is a data structure that maintains an ordering of keys in records 112 to allow forward and reverse scanning of keys. In some embodiments, database system 10 may be configured such that records 112 for committed transactions 102 are flushed in ascending key order (as well as version order); skip list 140 may allow this ordering to be quickly and easily determined. As will be described in greater detail below with respect to FIG. 3, in some embodiments, skip list 140 includes indirect pointers for accessing records 112 of skip list 140. That is, rather than have direct pointers between records 112 (i.e., pointers specifying the memory addresses of records 112), skip list 140 includes indirect pointers to the hash buckets 124, which include the direct pointers to chains 110. Advantageously, if a new record 112 gets added to a record chain 110, the direct pointer in the hash bucket 124 is updated, not the indirect pointer in skip list 140. Use of indirect pointers may also enable skip list 140 to leverage hash-bucket latches 126 when manipulating records 112 with respect to list 140. Accordingly, if a record 112 for a transaction 102 is being accessed through skip list 140 for modification or removal, a latch 126 may be acquired for the record 112's key to prevent other modifications from being performed. As noted above, although shown separately from records 112 in FIG. 1, portions of skip list 140, in some embodiments, may reside in records 112 as will be discussed with respect to FIGS. 2 and 3.

Checkpoint engine 150, in one embodiment, includes program instructions that are executable to periodically back up/checkpoint skip list 140 in order to facilitate a subsequent recovery of skip list 140. In some embodiments, checkpoint engine 150 may preserve additional data structures of database system 10 including active transaction list 130. As will be discussed with FIG. 7, checkpoint engine 150 may create a base checkpoint that is usable to recover the entire skip list 140 and one or more incremental checkpoints that are usable in conjunction with a base checkpoint to recover skip list 140. In some embodiments, the base checkpoint is created in conjunction with a flush of records 112 to persistent storage 108 as this reduces the number of records 112 being stored as part of the checkpoint as flushed records 112 are not stored as part of the checkpoint since flushed records 112 are already present in storage 108. To differentiate between flushed records 112 and unflushed records 112 when creating a base checkpoint, checkpoint engine 150 may perform a scan of skip list 140 to identify unflushed key-value records 112 relevant to the checkpoint for preservation as will be discussed with FIG. 8A. As part of the scan, checkpoint engine 150 may further determine whether records 112 correspond to active or committed transactions 102 and exclude active transactions 102 from the checkpoint as their records 112 may not need to be recovered in the event of a crash as active transactions 102 can be rolled back and flushed records 112 already have been recorded to persistent storage 108. To account for the exclusion of flushed records 112 and active-transaction records 112, checkpoint engine 150 may modify skip-list pointers in some key-value records 112 being copied to persistent storage 108 so that the checkpointed version of skip list 140 does not include pointers to records 112 that were not stored as part of the checkpoint. In such an embodiment, the original version of skip list 140 current in use and residing in memory may remain unmodified as those pointers may still be used by other components of transaction manager 104. In various embodiments, when an incremental checkpoint is later created, checkpoint engine 150 may perform a scan in similar manner as with a base checkpoint, but engine 150 also considers records 112 that belong to one or more earlier checkpoints as an insertion of a key-value record 112 associated with the current checkpoint may modify pointers in key-value records 112 belonging to the one or more earlier checkpoints. As will be discussed FIG. 8B, if such a modification has been determined, checkpoint engine 150 may store these key-value records 112 and modify some of their pointers as part of creating an incremental checkpoint. In illustrated embodiment, checkpoint engine 150 stores the relevant key-value records 112 in database persistent storage 108 within checkpoint segments 152, which will be discussed below with FIG. 11.

If an issue later occurs with skip list 140 (or buffer data structure 106), checkpoint engine 150 may receive a request to recover skip list 140 and may read stored key-values records 112 from one or more created checkpoints in checkpoint segments 152 to recover skip list 140. In various embodiments, checkpoint engine 150 reassembles skip list 140 by indexing into hash table 120 using keys of read key-value records 112 and, based on the indexing, appends the key-value records 112 to record chains 110 pointed to by hash buckets 124. As will be described with FIG. 12, reassembling skip list 140 in this manner may allow multiple portions of skip list 140 to be reassembled concurrently using a thread pool instantiated by checkpoint engine 150. As additional transactions 102 may have committed after the most recently created checkpoint, checkpoint engine 150 may also replay transaction log 105 to identify database transactions 102 that subsequently committed and, based on the replaying, insert one or more additional key-value records 112 as part of the recovery.

The contents of records 112, including those used to implement skip list 140, will now be discussed in greater detail in order to facilitate better understanding of the fast scan algorithm discussed in detail later.

Figure 2:
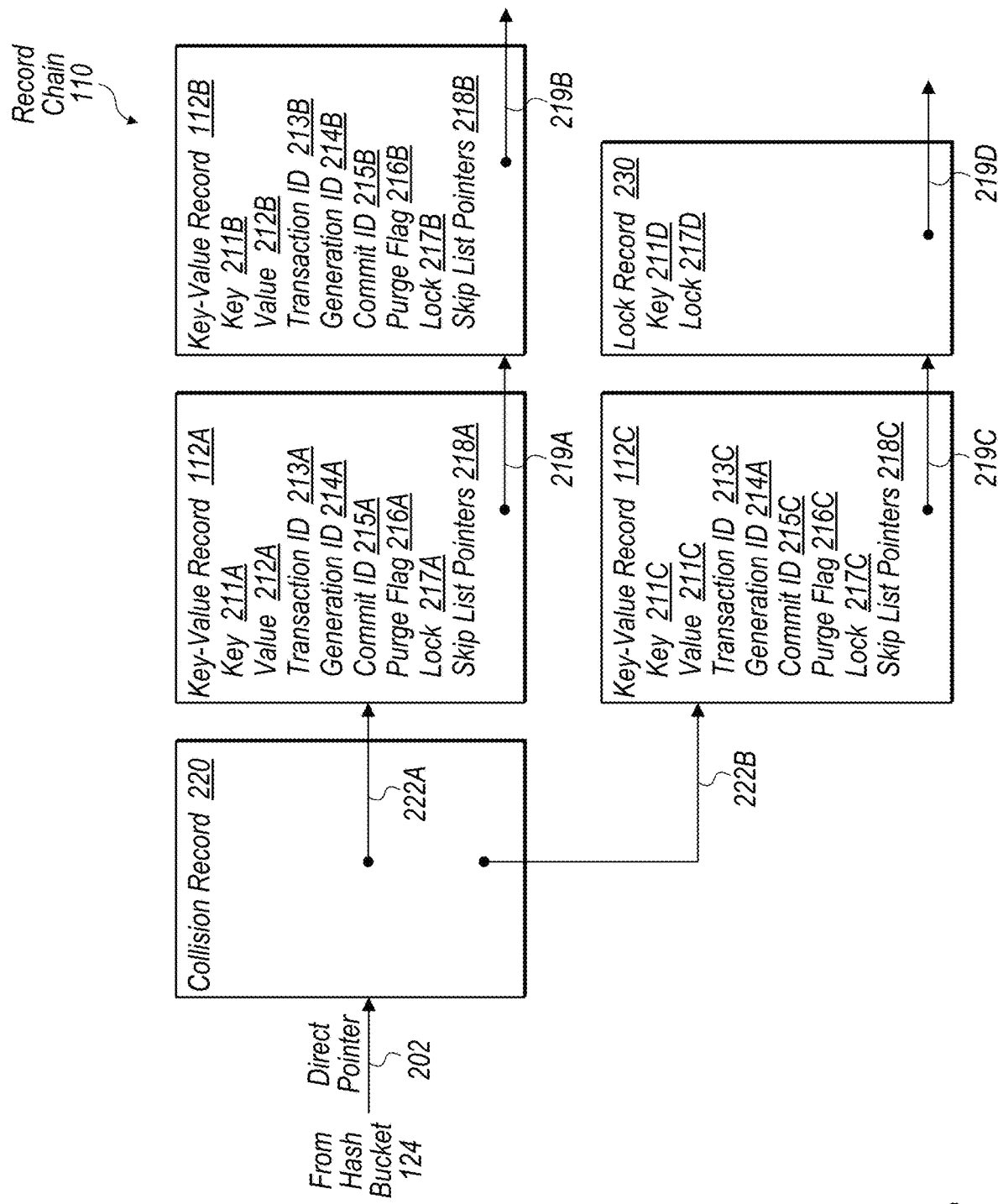
FIG. 2 is a block diagram illustrating one embodiment of a record chain within the buffer data structure.

Turning now to FIG. 2, a block diagram of a record chain 110 is depicted. As shown, record chain 110 may include a collection of key-value records 112A-112C, a collision record 220, and a lock record 230. Records 112 may further include a key 211, value 212, transaction identifier 213, generation identifier 214, commit identifier 215, purge flag 216, lock 217, skip list pointers 218, and record-chain pointer 219. In some embodiments, chain 110 may include more (or fewer) records 112, 220, or 230 than shown; a given record 112 may also include more (or fewer) elements 211-219 than shown.

In the illustrated embodiment, record chain 110 is implemented using a linked list such that each key-value record 112 includes a pointer 219 identifying the next record 112 in the chain 110. When a record 112 is added, it is inserted at the head identified by the direct pointer 202 in the hash bucket 124 or appended to a collision record 220 discussed below. The added record 112 may then include a pointer 219 to the record that was previously at the head. As the record 112 becomes older, it migrates toward the tail (record 112B or lock record 230 in FIG. 2) until its transaction 102 commits. Then, it may be flushed to database 108's persistent storage and removed. A given record 112's transaction identifier 213 may identify, not only the transaction 102 to which the record 112 is associated, but also indicate the ordering in which transactions 102 were received. Accordingly, since record 112B is further from the head than record 112A, transaction ID 213B may correspond to an earlier transaction 102 than transaction ID 213A. If the transaction 102 corresponding to transaction ID 213B is to be rolled back, transaction manager 104 may locate record 112B by referencing direct pointer 202 to identify the head of chain 110 and traverse through records 112A and 220 until finding the record 112B having the corresponding transaction ID 213B. Record 112B may then be removed and pointer 222A modified to have the same address as pointer 219B. In some embodiments, if a transaction 102 commits, the commit identifiers 215 for its records 112 may be set to reflect the commitment and mark the record 112 as being ready for flushing to database 108's persistent storage. Records 112 may later be scanned by a process of transaction manager 104 to identify which records 112 have commit identifiers 215 and to determine which records 112 can be flushed to database persistent storage 108.

When a record 112 is inserted into buffer data structure 106, in various embodiments, transaction manager 104 (or checkpoint engine 150 in some embodiments) records a generation ID 214 indicative of the relevant checkpoint to which the record 112. As will be discussed below, checkpoint engine 150 may compare generation identifiers 214 to a generation identifier associated with the checkpoint being created to determine whether their corresponding key-value records are relevant to the checkpoint. When a checkpoint is being created, checkpoint engine 150 may increment the current generation identifier so that any subsequently received key-value records 112 are assigned to the next checkpoint to be created.

Once a key-value record 112 has been successfully flushed to persistent storage, in some embodiments, transaction manager 104 sets a purge flag 216 to indicate that the record 112 is ready for purging from buffer data structure 106. In some embodiments, checkpoint engine 150 may use purge flags 216 in records 112 to determine whether the records 112 have been flushed to database persistent storage 108 and thus can be excluded from a given checkpoint—even if a given record 112 has generation identifier 214 corresponding to the current checkpoint being created. In other embodiments, checkpoint engine 150 may track the latest flushed commit identifier 214 and determine which records 112 having been flushed by comparing this identifier 214 to those in records 112. In some embodiments, a purge engine may then read this flag 216 in order determine whether the record 112 should be purged from buffer data structure 106.

In some embodiments, collision records 220 are used to append records 112 to chain 110 when two different keys (e.g., keys 211A and 211C) produce the same hash value (i.e., a hash collision occurs) and thus share the same hash bucket 124. In various embodiments, the size of hash table 120 is selected to have a sufficient number of hash buckets 124 in order to ensure a low likelihood of collision. If a hash collision occurs, however, a record 220 may be inserted including pointers 222 to records 112 having different keys 211. Although, in many instances, a hash-bucket latch 126 is specific to a single respective key 211, in such an event, the hash-bucket latch 126 would be associated with multiple, different keys 211.

As noted above, in some embodiments, individual records 112 may also include their own respective locks 217 to provide additional coherency control. In some embodiments, a separate lock record 230 may also be inserted into record chains 110 to create a lock tied to a particular key when there is no corresponding value.

Skip list pointers 218, in one embodiment, are the pointers that form skip list 140. As will be discussed next with FIG. 3, pointers 218 within a given record 112 may form a pointer tower that implements a linked hierarchy of data records sequences, with each successive sequence skipping over fewer records 112 than the previous sequence. In some embodiments, pointers 218 are also implemented using indirect pointers through which key-value records 112 are linked together in skip list 140 without using direct pointers to the physical addresses of records 112. Instead, pointers 218 reference the hash buckets 124 that point to the record chains 110 including records 112. In various embodiments, using indirect pointers greatly simplifies pointer management because only one direct pointer may be maintained for a given record 112. That is, since the location of the hash bucket 124 remains in the same, the indirect pointer is not updated if a record 112 is moved, for example, to a later position in a record chain 110.

Figure 3:
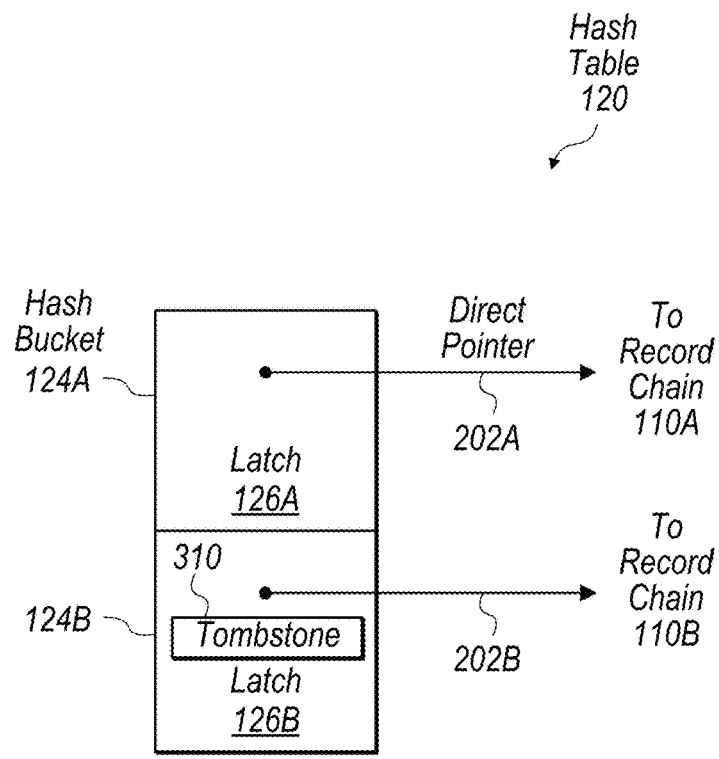
FIG. 3 is a block diagram illustrating one embodiment of a hash table within the buffer data structure.

Turning now to FIG. 3, a block diagram of hash table 120 is depicted. As noted above, in some embodiments, a given hash bucket 124 in hash table 120 includes a direct pointer 202 to the record chain 110 appended to that bucket 124. As noted above and discussed below, these pointers may be used not only to read and write records 112, but also to implement indirect pointers for active transaction list 130 and skip list 140. In various embodiments, a given bucket 124 may also include latch data for the latch controlling access to chain 110. For example, the hash bucket 124 may store the state of the latch along with an indication of what transaction holds the latch 126, in some embodiments. In another embodiment, however, a latch 126 may located outside of the hash bucket 124 for which it is associated.

In various embodiments, a given hash bucket 124 may also include a tombstone 310 for one or more records 112 that are removed in response a transaction being rolled back. As will be discussed below, checkpoint engine 150 may consider tombstones 310 when attempting to recover skip list 140. In some embodiments, tombstones 310 may be located elsewhere—or technique other than tombstoning may be used to account for removed records 112.

Figure 4:
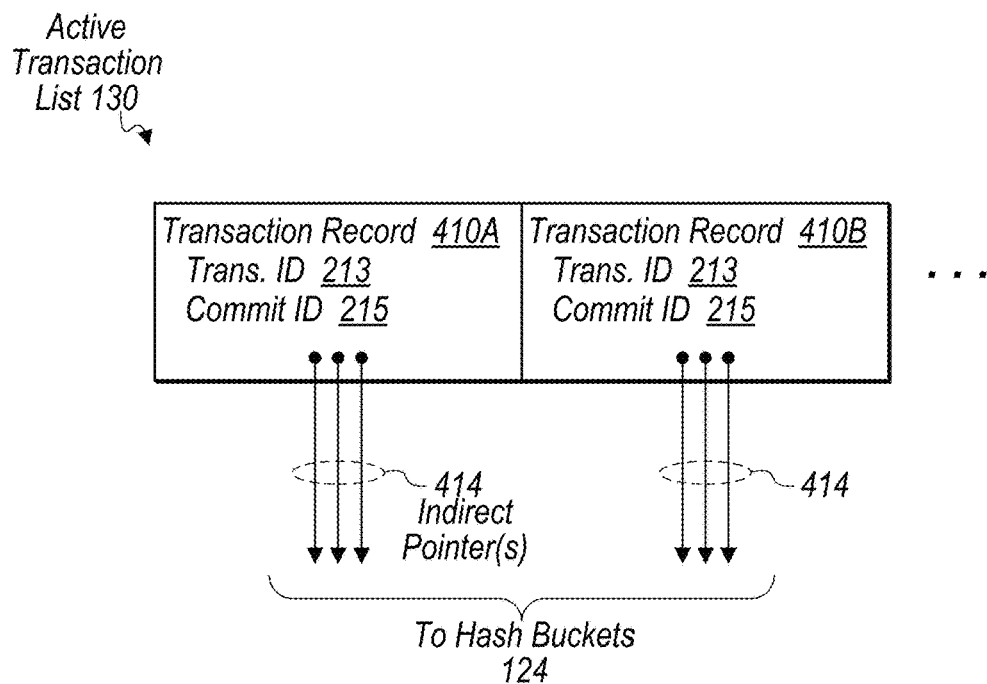
FIG. 4 is a block diagram illustrating one embodiment of an active transaction list within the buffer data structure.

Turning now to FIG. 4, a block diagram of active transaction list 130 is depicted. As noted above, in some embodiments, active transaction list 130 may be used to track various metadata for transactions 102 having key-value records 112 in buffer data structure 106. Accordingly, in the illustrated embodiment, active transaction list 130 includes a set of transaction records 410, which include a transaction ID 213, a commit ID 215, and one or more indirect pointers 414 to hash buckets 124. In some embodiments, list 130 may be implemented differently than shown in FIG. 4. Accordingly, more (or less) elements may be included in a given record 410 than shown such as one or more keys 211 associated with a transaction 102. Although depicted as being implemented using an array of records 410, in other embodiments, list 130 may be implemented using other types of data structures such as a linked list or a hash table that is indexed into based on a transaction identifier 213.

Transaction identifier 213, in one embodiment, is included to establish an association of a transaction 102 to its key-value records 112. As noted above, in various embodiments, this association may be used to determine which records 112 should be removed in the event that the transaction 102 is rolled back. This association may also be used to determine which records 112 can be marked for flushing to persistent storage 108 once the transaction 102 is committed. That is, in some embodiments, when a transaction 102 completes its operations, the commit identifier 215 in its transaction record 410 may be set. The record 410 may then be used to locate the corresponding records 112 and set their respective identifiers 217, which may indicate that they are ready for flushing to database persistent storage 108.

Indirect pointers 414, in one embodiment, are included to allow a key-value record 112 to be accessed from list 130 without using a direct pointer to the record 112 or recalculating the hash value for accessing a hash bucket 124 by applying hash function 122 to a key 211. As noted above, using indirect pointers 414, which point to the hash buckets 124 including the direct pointers 202 to the corresponding record chains 110, greatly simplifies pointer management because only a direct pointer 202 is updated when the head of a record chain 110 is relocated. That is, since the location of the hash bucket 124 remains in the same, the indirect pointer 414 can be traversed to identify the bucket 124 with the direct pointer 202 identifying the new location of the head. In some embodiments, a given transaction record 410 includes an indirect pointer 414 for each record 112 associated with that record 410's transaction 102. In another embodiments, records 112 may be linked together using indirect pointers as they are inserted for a transaction 102. In such an embodiment, a given record 410 may include a single indirect pointer 414 to the last record 112 inserted for the transaction 102. If earlier inserted records 112 need to be accessed, the indirect pointer 414 may be traversed along with one or more indirect pointers in the linked records 112.

As noted above, in some embodiments, hash-bucket latches 126 may be used when particular operations are performed that use active transaction list 130. For example, if a transaction 102 has completed its operations, hash-bucket latches 126 may be acquired to set the commit identifier 215 in each of its key-value records 112. Latches 126 may also be acquired when list 130 is used to locate records 112 being removed as part of a transaction rollback.

As will be discussed with FIG. 8, in some embodiments, checkpointing skip list 140 may include checkpoint engine 150 storing the current version of active transaction list 130 in database persistent storage 108.

Figure 5:
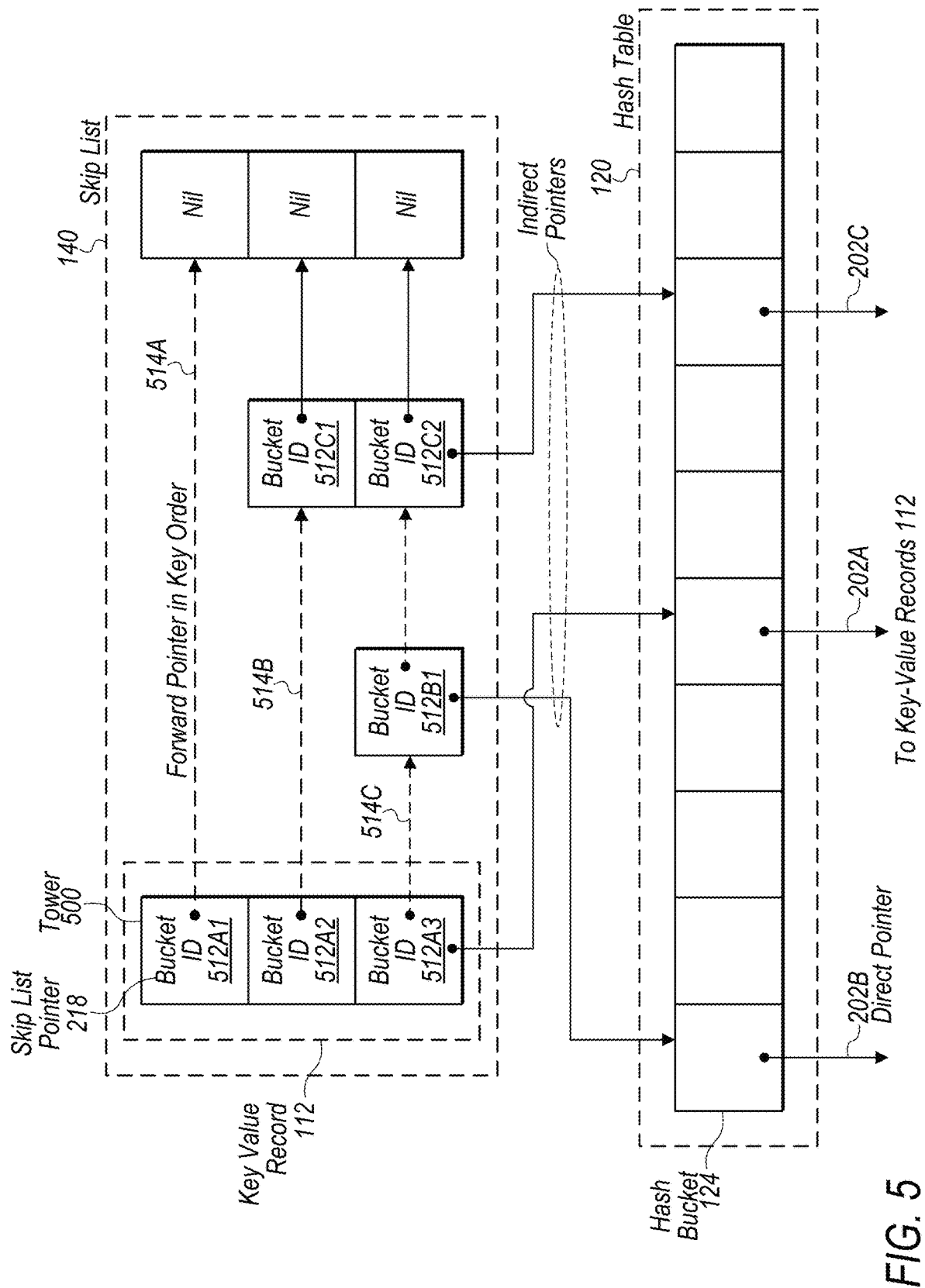
FIG. 5 is a block diagram illustrating one embodiment of a skip list within the buffer data structure.

Turning now to FIG. 5, a block diagram of skip list 140 is depicted. As noted above, in various embodiments, skip list 140 may be used to maintain an ordering of keys 211 stored in records 112, which may be used to flush records 112 of committed transactions 102 in ascending key order. In the illustrated embodiment, skip list pointers 218 within a record 112 form a tower 500 that point to towers 500 in other records 112.

When a particular key 211 is being searched in skip list 140, traversal of skip list 140 may begin, in the illustrated embodiment, at the top of the left most tower 500 (the location corresponding to bucket ID 512A1 in the illustrated embodiment), where the key 211 in record 112 is compared against the key being searched. If there is a match, the record 112 being searched for has been located. If not, traversal proceeds along the path of forward pointer 514A to another record 112 having another key 211, which is compared. If that key 211 is less than key 211 being searched for, traversal returns to the previous tower 500 and drops down to the next level in the tower 500 (the location of bucket ID 512A2 in FIG. 5). If, however, the key 211 being search for is greater than the other key 211, traversal proceeds forward along another pointer 514. This process then continues onward until a match is identified for the record 112 being searched for. An example of this traversal will be discussed below with FIG. 6.

Although forward pointers 514 are depicted in FIG. 5 (and subsequent figures) to facilitate understanding, skip list pointers 218, in some embodiments, are implemented using indirect pointers. In the illustrated embodiment, skip list pointers 218 are specifically implemented using bucket identifiers 512 that point to buckets 124 in hash table 120, which in turn point to records 112 via pointers 202. Thus, proceeding along pointer 514C includes following the pointer 218 of bucket ID 512A3 to a bucket 124 and proceeding along pointer 202A to the record chain 110 including the record 112 with the pointer 218 of bucket 512B1. Although not depicted, in some embodiments, skip list 140 also includes a set of backward pointers, which may be implemented in a similar manner and will be discussed in greater detail below.

Before discussing the checkpointing algorithm, it is instructive to consider how record insertion may be implemented.

Figure 6:
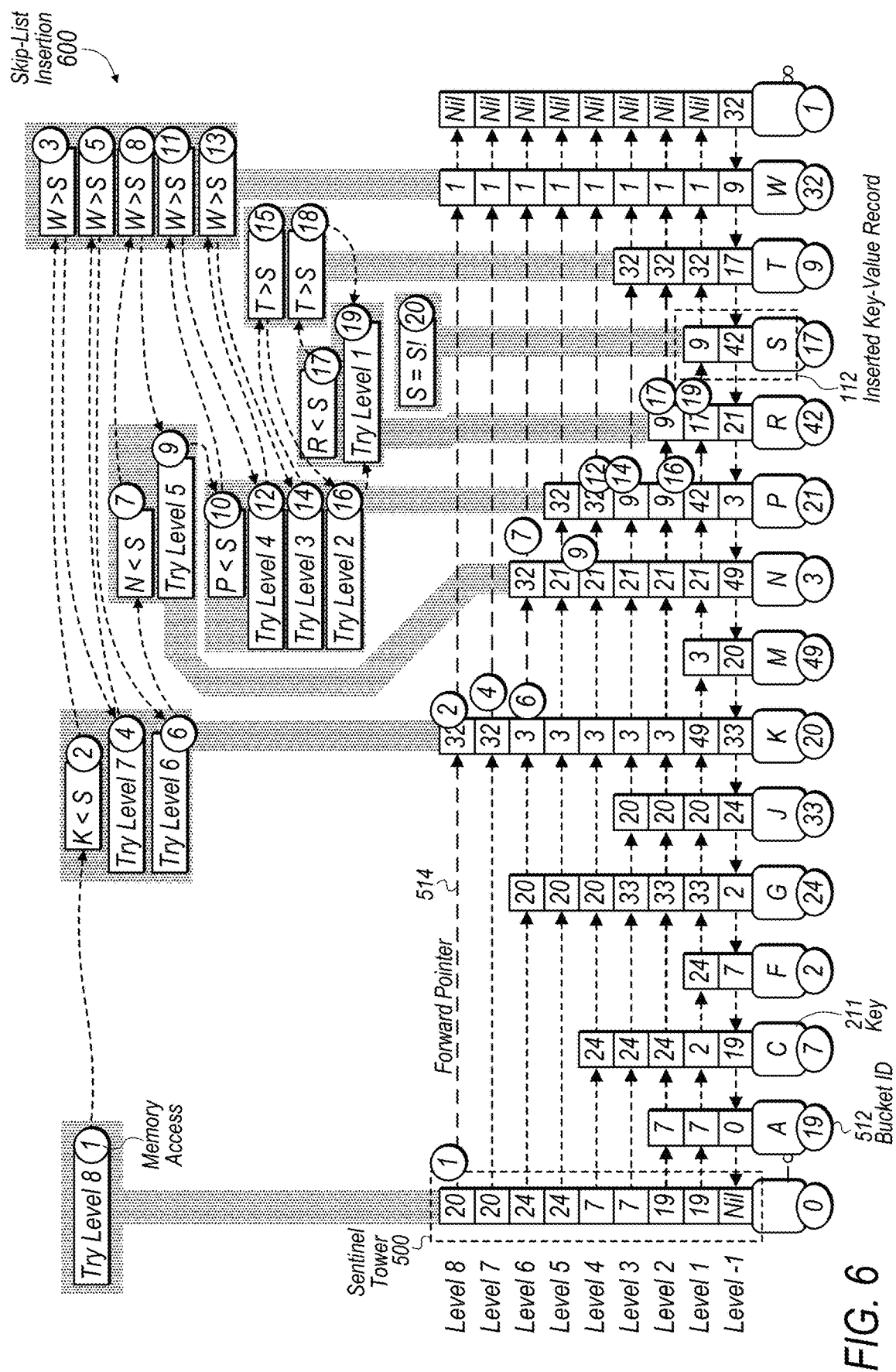
FIG. 6 is a block diagram illustrating one embodiment of a skip-list insertion.

Turning now to FIG. 6, a block diagram of a skip-list insertion 600 is depicted. As will be discussed, inserting a single record 112 into skip list 140 can include several memory accesses in order to identify where to insert a record 112. As such, this can make recovering a skip list 140 a tedious process if record insertion 600 is relied upon to reinsert a large number of records 112, which, in some embodiments of database system 10, can include almost 200,000,000 records 112.

As shown in FIG. 6, an example skip list 140 may be constructed from records 112 sorted in ordering of keys 211A-W. The skip list 140 includes eight levels (shown as levels 1-8) of forward pointers 514 allowing for movement in ascending key order and another level (shown as level −1) of backward pointers allowing for movement in descending key order. In some embodiments, large skip lists 140 may have considerably more levels, however. Sentinel towers 500 are located at either end of the skip list 140 and do not correspond to a record 112 (and thus are shown having keys of −∞ and ∞). Also, beneath each key 211 in FIG. 6 is the bucket identifier 512 for the bucket 124 including a direct pointer 202 to that record 112 (or its record chain 110). Thus, as shown, the bucket 124 having the bucket identifier 512 of 19 includes a pointer 202 to a record 112 with a key 211 of A.

In the example depicted in FIG. 6, insertion 600 is being performed to insert a record 112 having key 211 of S (or simply "record S"). As shown, insertion 600 begins with skip-list traversal at the top of the sentinel tower 500 on the left in which a first memory access is performed to read the skip list pointer 218 at level 8, which includes a bucket ID 512 of 20. A second memory access is then performed to read the record 112 pointed to by bucket #20, which is a record 112 having a key K. Because the key S is greater than key K in key order, the traversal continues along level 8 where a record W is read during a third memory access. Because key S is less than key W, the traversal returns to record K in a fourth memory access to read the skip list pointer 218 for the level 7, the next level down.

As can be seen, this process continues for another twenty memory accesses until record R is identified as having a pointer 218 of bucket #17 to record—not including the additional memory accesses for using indirect pointers or the multiple accesses to move down a record chain 110. Furthermore, insertion 600 may be performed multiple times to insert multiple records 112 associated with a given transaction. Moreover, in some embodiments, skip list 140 may include much taller skip list towers 500 (e.g., ones having 33 levels) and be substantially wider. All these memory accesses can affect system performance. In many instances, the checkpointing algorithm discussed next uses far fewer memory accesses as most records 112 can be reinserted into skip list 140 without having to rely on the skip list traversal performed with skip-list insertion 600.

Figure 7:
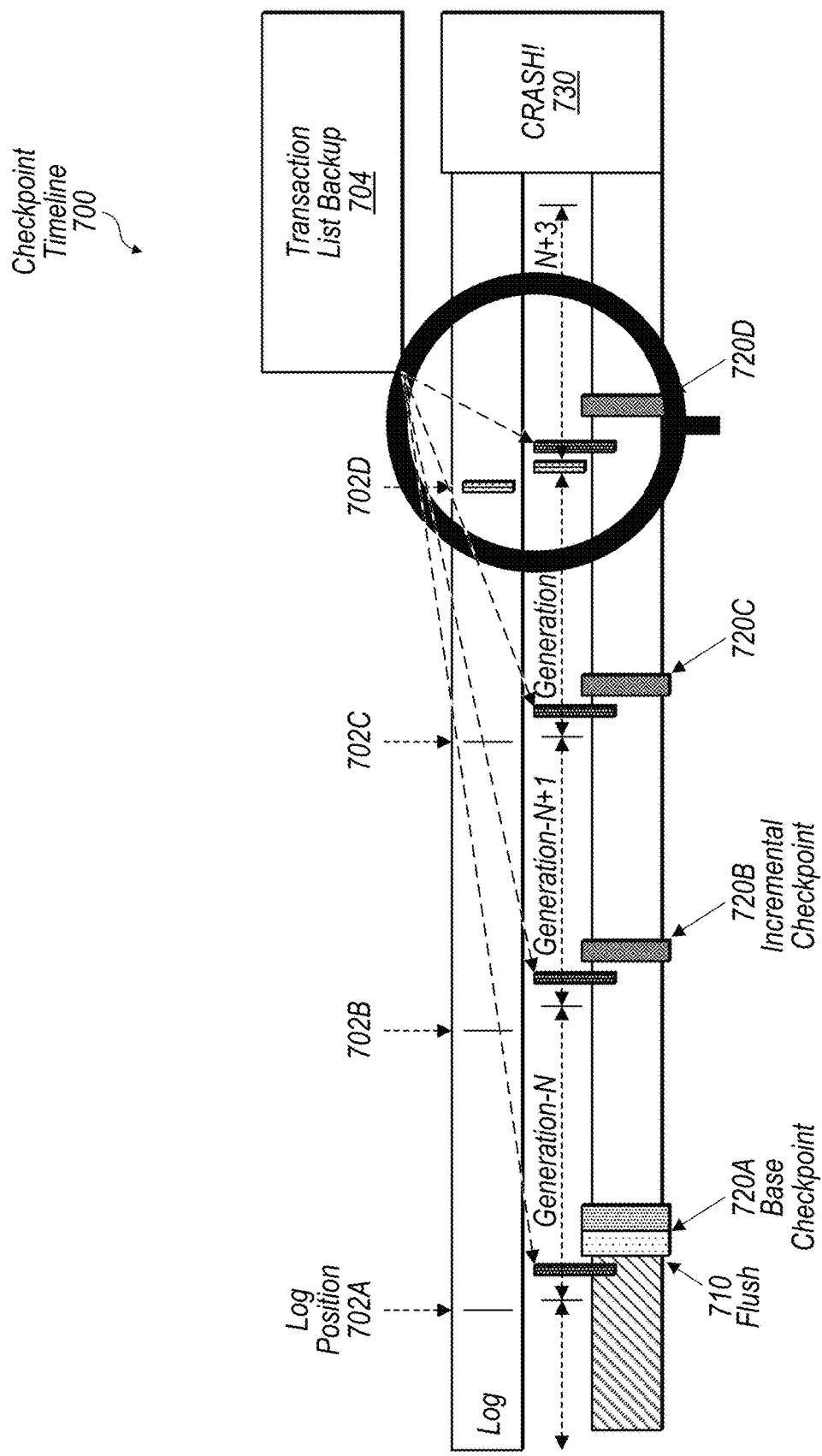
FIG. 7 is a timing diagram illustrating one embodiment of a checkpoint timeline for checkpointing a skip list.

Turning now to FIG. 7, a timing diagram of a checkpoint timeline 700 is depicted. As will be discussed, checkpoint engine 150 may perform various actions in conjunction with creating a checkpoint of skip list 140 in order to facilitate recovery of skip list 140. In the illustrated embodiment, timeline 700 begins with transaction manager 104 determining to perform a flush 710 of records 112 of committed transactions 102 from buffer data structure 106 to database persistent storage 108.

As shown, checkpoint engine 150 may initially record the current address/position 702A of transaction log 105 in order to serve as a starting point for replaying log 105 should a crash occur. In the illustrated embodiment, log position 702A is recorded some interval before flush 710 and checkpoint 720A as checkpoint engine 150 (or more generally transaction manager 104) may need to replay transaction information received in advance of flush 710 and checkpoints 720 in order to identify all pertinent information needed for recovery. Checkpoint engine 150 may then adjust (e.g., increment) the current generation identifier 214 being assigned to newly inserted records 112, so that they are associated with the next checkpoint and not considered as part of the current checkpoint being created. Checkpoint engine 150 may also perform a backup 704 of active transaction list 130 to storage 108. Once this has been completed, transaction manager 104 may perform a flush 710 of committed transaction records 112 to persistent storage 108. Checkpoint engine 150 may then create a base checkpoint 720A for records 112 that were not stored in persistent storage 108 as part of the flush in order to facilitate their recovery in the event of some problem.

Before a subsequent flush 710 is performed, these actions may be repeated as subsequent incremental checkpoints 720B-720D are created. If a crash 730 occurs after checkpoint 720D, checkpoint engine 150 may use checkpoints 720A-720D to recover skip list 140 to a point in time when checkpoint 720D was created. Checkpoint engine 150 may then replay transaction log 105 from position 702D to the present in order to recover skip list 140 to its current state at the time of crash. 730.

It is worth noting that timeline 700 is merely one example of various actions that may be performed in conjunction with creating a checkpoint skip list 140. In other embodiments, timeline 700 may include different actions—particularly in embodiments that use the checkpoint algorithm in systems others than database systems.

Figure 8A:
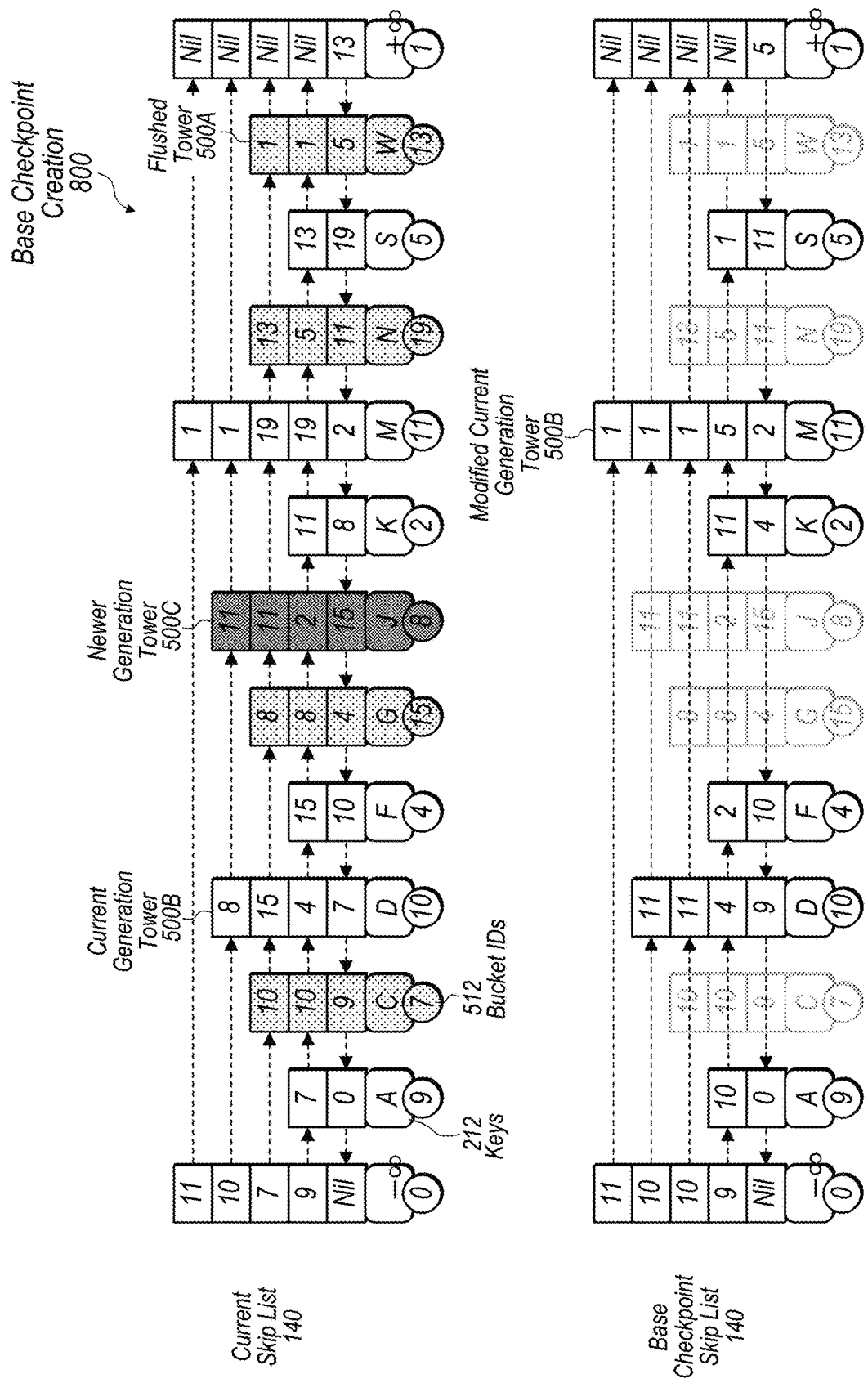
FIGS. 8A-8B are block diagrams illustrating embodiments of modifying skip-list pointers to create a checkpoint.

Turning now to FIG. 8A, a block diagram of a base checkpoint creation 800 of is depicted. As noted above, checkpoint engine 150 may scan skip list 140 to determine which records 112 are relevant to the checkpoint being created. Accordingly, in the example shown in FIG. 8A, engine 150 may determine that records 112 having current generation towers 500B associated with bucket identifiers 512 of 0, 9, 10, 4, 2, 11, 5, and 1 are relevant to base checkpoint creation 800. Engine 150 may also determine that skip list 140 currently has other records 112 that are not such as flushed records 112 corresponding to flush towers 500A and records 112 assigned to the next generation and having a newer generation tower 500C.

As these records 112 may be excluded from the checkpoint 720 in various embodiments, checkpoint engine 150 may modify the pointers in some checkpointed towers 500 to account for irrelevant towers 500 not being present in the recovered skip list 140. For example, the pointers 218/514 in modified current generation tower 500B has been updated, so that they do not point to the record 112 associated with bucket identifier 19 and instead point to bucket identifiers 5 and 1 having corresponding to towers 500 that are being stored as part of base checkpoint creation 800. Thus, if a crash later occurs, the correct pointers 218 are already present in the towers 500.

As a base checkpoint 720 includes information sufficient to recover skip list 140 without the aid of other checkpoints 720, scan engine 150 can forgo considering the impact of records 112 associated with other checkpoints 720, in contrast to an incremental checkpoint 720 described next.

Figure 8B:
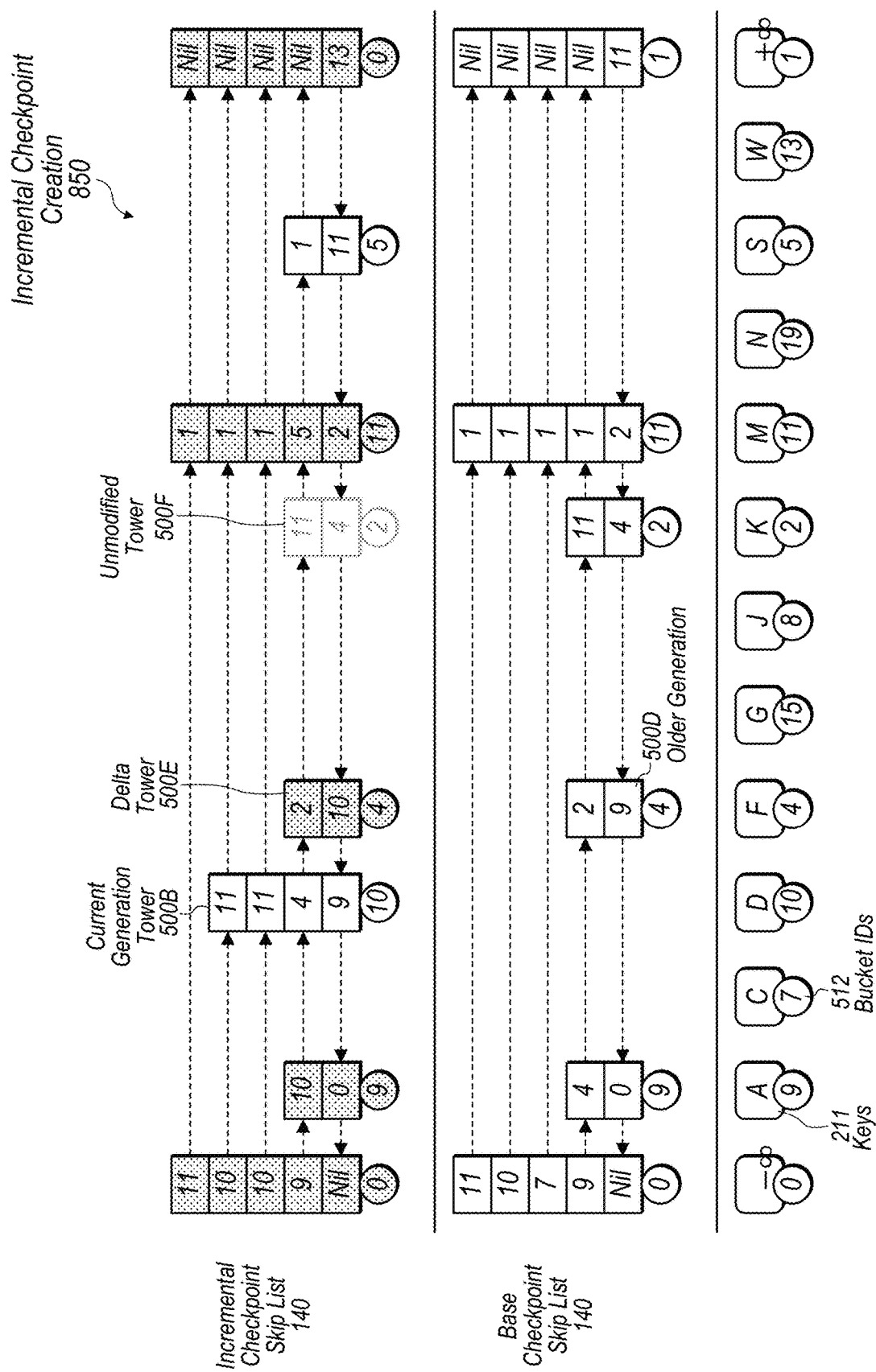

Turning now to FIG. 8B, a block diagram of incremental checkpoint creation 850 is depicted. In addition to considering flushed records 112 and those of later checkpoints 720, checkpoint 150 also considers the impact of newly inserted records 112 on records 112 of earlier checkpoints when creating an incremental checkpoint 720. For example, as shown in FIG. 8B, checkpoint engine 150 may scan skip list 140 and identify newly inserted records 112 at hash buckets 10 and 5. As part of this scanning, checkpoint engine 150 may also identify additional records 112 belonging to one or more earlier checkpoints and that modified pointers in towers 500 (referred to as delta towers) resulting from these insertions. For example, a tower 500D of an older generation has had its backwards pointer updated from pointing bucket identifier 9 to bucket identifier 10. As will be discussed with FIG. 9, checkpoint engine 150 may store not only the newly inserted records 112 associated with the current checkpoint 720 but also the records 112 of earlier checkpoints 720 having delta towers 500E. Checkpoint engine 150, however, may not store records 112 associated with earlier checkpoints 720 that include unmodified towers 500F as these records 112 have already been stored in storage 108 during creation of earlier checkpoints and engine 150 can rely on these earlier stored records 112.

Various elements used to implement checkpoints 720 will now be discussed.

Figure 9:
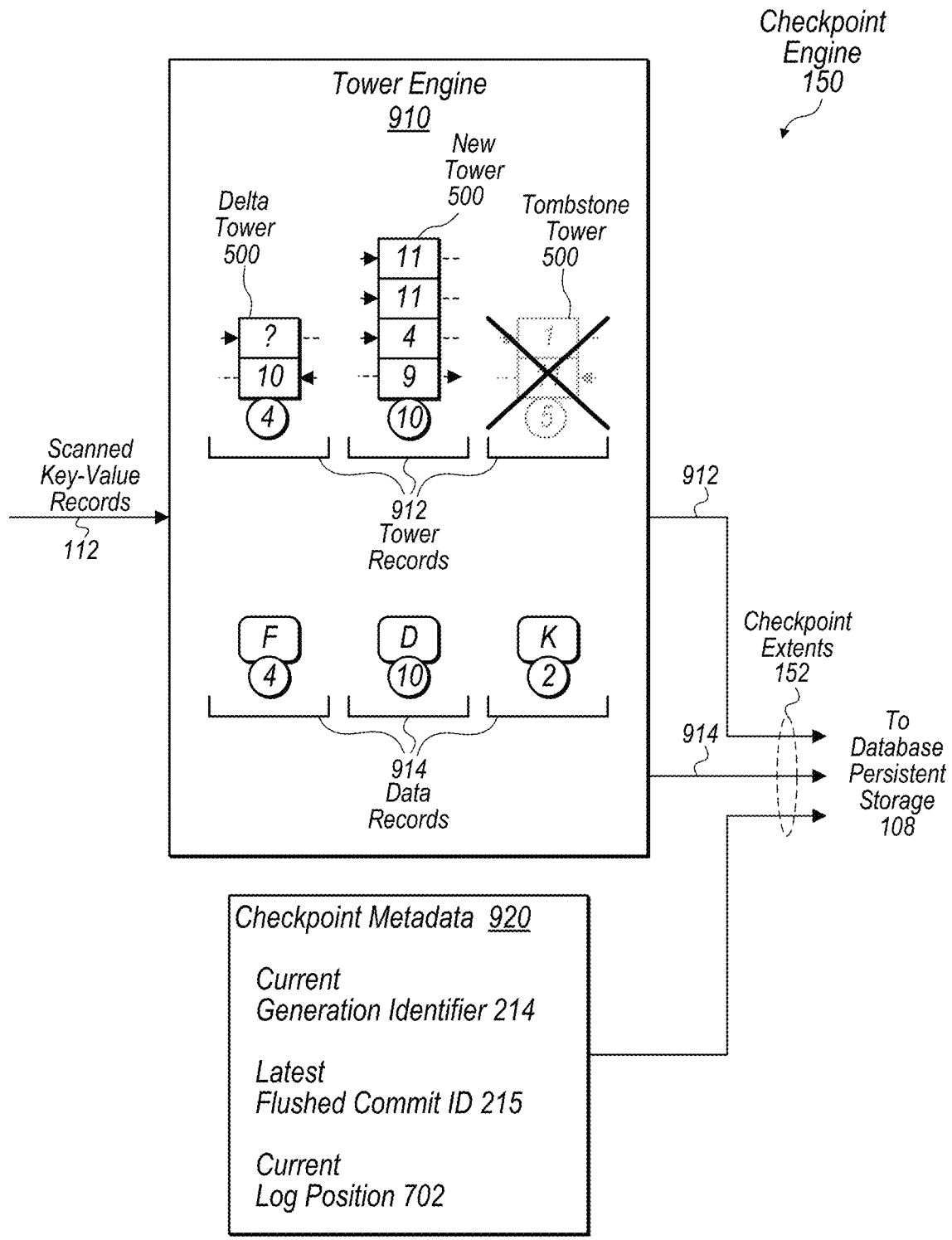
FIG. 9 is a block diagram illustrating one embodiment of a checkpoint engine that creates checkpoints of a skip list.

Turning now to FIG. 9, a block diagram of checkpoint engine 150 is depicted. In the illustrated embodiment, checkpoint engine 150 includes a tower engine 910 and processes checkpoint metadata 920. Checkpoint metadata 920 further includes a current generation identifier 214, latest flushed commit identifier 215, and current log position 702. In some embodiments, checkpoint engine 150 may be implemented differently than shown.

Tower engine 910, in one embodiment, includes program instructions executable to determine what records 112 should be recorded for a given checkpoint 720—as well as the appropriate pointers 514 to include in those recorded records 112. In various embodiments, tower engine 910 identifies records 112 as being relevant to the current checkpoint being created by comparing the generation identifiers 214 in scanned records to the current generation identifier 214 of the checkpoint being created, which engine 150 maintains in metadata 920. In various embodiments, tower engine 910 may identify flushed records 112 in a similar manner by comparing the commit identifiers 215 in those records 112 to a latest flushed commit identifier 215 in metadata 920.

As relevant records 112 are being identified in the illustrated embodiment, tower engine 910 may determine what towers 500 need to be modified by initially creating an empty tower records 912 for each unflushed record 112 and filling in the tower 500 with pointers 218 as checkpoint engine 150 scans through skip list 140. If a base checkpoint is being created, engine 910 may store each tower record 912 in storage 108 once it is filled. If an incremental checkpoint is being created, tower engine 910 may create empty tower records 912 for unflushed records 112 associated with the current checkpoint as well as unflushed records 112 associated with previous checkpoints. For newly inserted records 112 associated with the current checkpoint, engine 910 may store their tower records 912 in storage 108 once they become filled. For records 112 associated with earlier checkpoints, engine 910 may examine their towers 500 once they have been filled. If any pointers to new records 112 exist, engine 910 may store these tower records 912 as they include delta towers 500, which have been changed since the previous checkpoint. If, however, no pointers exist to new towers 500, engine 910 may discard these records 912 without storing them to storage 108. In some embodiments, if a record 112 has been removed (e.g., due to a transaction rollback) as determined by a tombstone 310 in hash bucket 124, tower engine 910 may still create a corresponding record in persistent storage 108 for a tombstone tower 500. An example illustrating tower record filling will be discussed below with FIG. 10.

As identifying pointers 218 for towers 500 can take time, in some embodiments, tower engine 910 (or more generally checkpoint engine 150) may separate a key-value record 112's value 212 from its pointers 218 in order to begin storing values 212 earlier for records 112 while their towers 500 are being determined as storing values 212 can also consume time. Accordingly, in the illustrated embodiment, checkpoint engine 150 may initially store, for a particular key-value record 112, a data record 914 that includes the value 212 in database persistent storage 108. Checkpoint engine 150 may then store tower record 912 that includes the skip list tower 500 once it has been determined. In other embodiments, however, records 112 may be stored without being separated into records 912 and 914. In some embodiments, checkpoint engine 150 may also store additional information such as checkpoint metadata 920 including current log position 702 as will be discussed below with FIG. 11.

Figure 10:
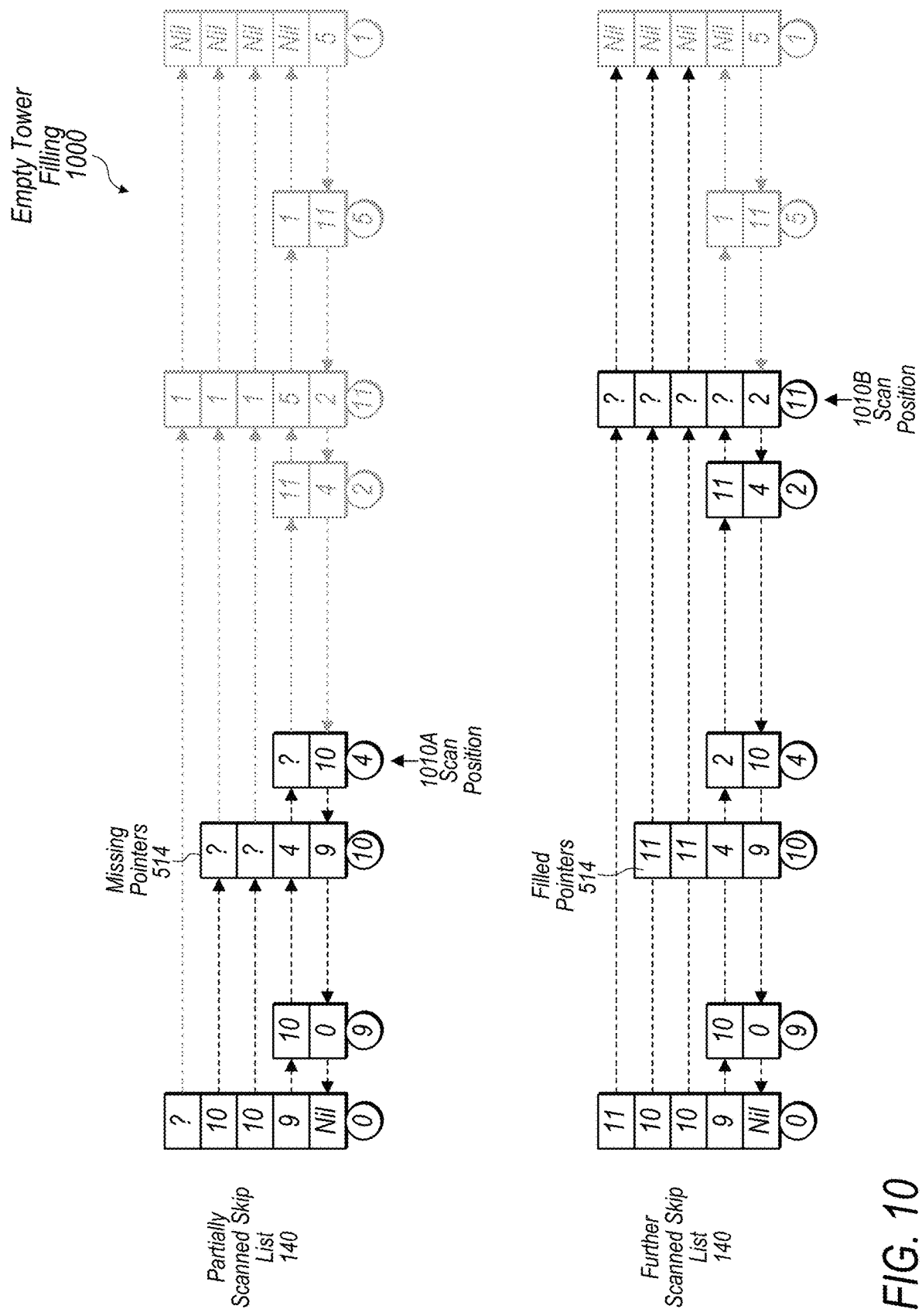
FIG. 10 is a block diagram illustrating one embodiment of a filing empty skip-list towers.

Turning now to FIG. 10, a block diagram illustrating an example of empty tower filling 1000 is depicted. As shown, tower engine 910 may create tower records 912 with empty towers 500. As engine 150 scans forward through skip list 140, tower engine 910 is able to fill in these towers 500 with pointers 514 as it encounters the later towers 500. For example, in FIG. 10, a tower 500 associated with a bucket identifier 512 of 10 includes two missing pointers 514 when the scan is currently at position 1010A. Once the scan proceeds forward to position 1010B, tower engine 910 is able fill these pointers 514 in once it identifies the tower 500 at bucket 11.

Figure 11:
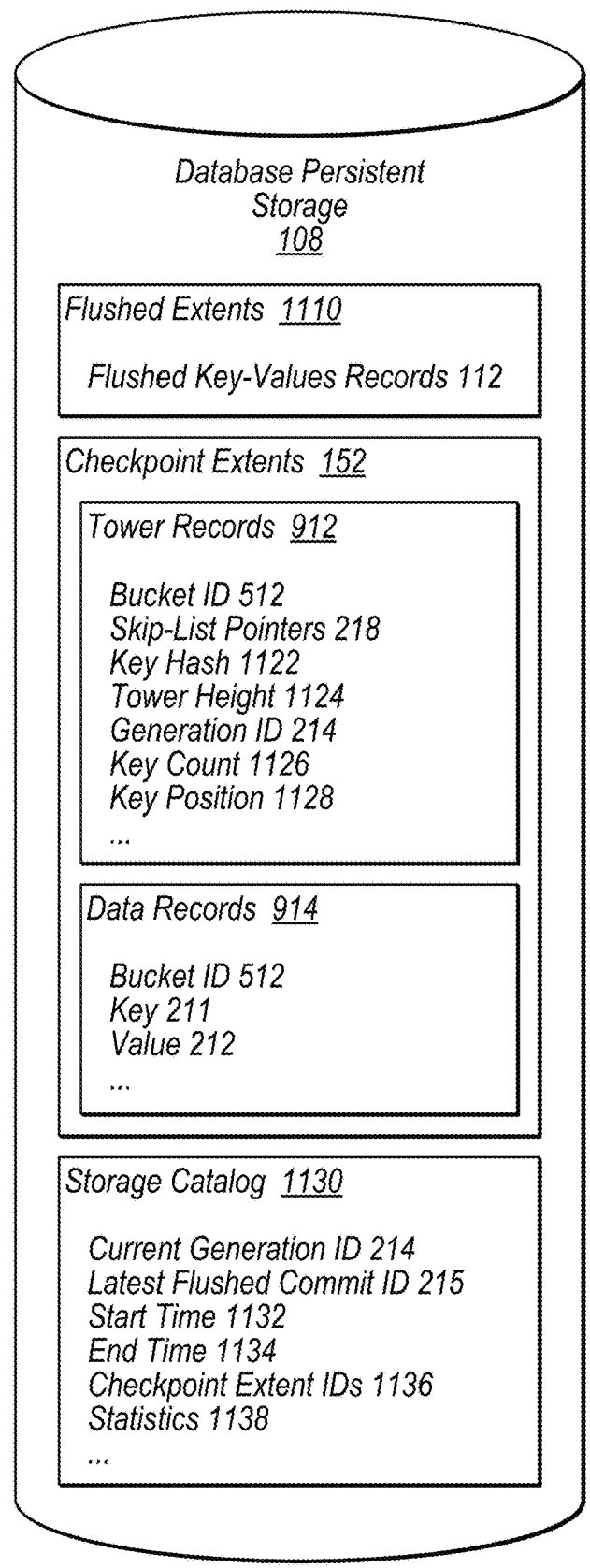
FIG. 11 is a block diagram illustrating one embodiment of various elements written to a persistent storage for a created checkpoint.

Turning now to FIG. 11, a block diagram of various elements within database persistent storage 108 is depicted. In the illustrated embodiment, database persistent storage 108 includes flushed extents 1110, checkpoint extents 152, and storage catalog 1130. In some embodiments, database persistent storage 108 may include more (or fewer) elements than shown. For example, storage 108 may include copies of transaction list 130 as mentioned above with FIG. 7.

Flushed extents 1110, in one embodiment, are files that include multiple flushed key-value records 112 for committed transactions 102. When subsequent queries are received, database system 10 may later access flushed extents 1110 to locate relevant key-value records 112. As noted above and discussed further below, in some embodiments, flushed extents 1110 (as well as checkpoint extents 152) may be stored using an LSM Tree.

As noted above, checkpoint extents 152 may include checkpointed key-value records 112, which, in some embodiments, are separated into tower records 912 and data records 914. In the illustrated embodiment, a tower record 912 includes a corresponding bucket identifier 512, skip-list pointers 218 for a tower 500, key hash 1122, tower height 1124, generation identifier 214, key count 1126, and key position 1128. A data record 914 include a bucket identifier 512, key 211, and value 212. In other embodiments, more (or fewer) elements may be included in records 912 and 914.

Key Hash 1122, in one embodiment, is a hash value of a key 211 associated with a tower record 912. As will be discussed, checkpoint engine 150 may use key hash 1122 during a skip-list recovery to match a tower record 912 with its corresponding data record 914.

Tower Height 1124, in one embodiment, identifies the number of pointers 218 in a tower record 912's skip list tower 500.

Generation identifier 214, in one embodiment, identifies the generation/checkpoint 720 associated with the tower record 912.

Key Count 1126, in one embodiment, identifies the number of keys 211 in a record chain 110 when key-value record 112 is checkpointed. As will be discussed, checkpoint engine 150 may delay matching tower records 912 and data record 914 appended to a given record chain 110 until it can confirm that number of keys 211 for appended records 912 and 914 matches the latest key count 1126 in records 912 and 914.

Key Position 1128, in one embodiment, identifies the position of record 112's key 211 in a given record chain 110 when the record 112 is checkpointed. As will be discussed, checkpoint engine 150 may use key positions 1128 to facilitate matching records 912 and 914—and determine which tower 500 to use for a set of appended records 112 having the same key 211.

Storage catalog 1130, in one embodiment, includes various metadata used by transaction manager 104 to implement database system 10. In the illustrated embodiment, checkpoint engine 150 stores, in storage catalog 1130 for a given checkpoint 720, the current generation identifier 214 and latest flushed commit identifier 215 at the time of checkpoint creation. Checkpoint engine 150 may store a start time 1132 and end time 1134 for the transactions 102 associated with the checkpoint 720. Checkpoint engine 150 may also checkpoint extent identifiers 1136 identifying the relevant checkpoint extents 152 for the checkpoint 720 and various statistics 1138 about a given checkpoint 720.

This information may later be read by checkpoint engine 150 to facilitate a recovery of skip list 140 as discussed next.

Figure 12:
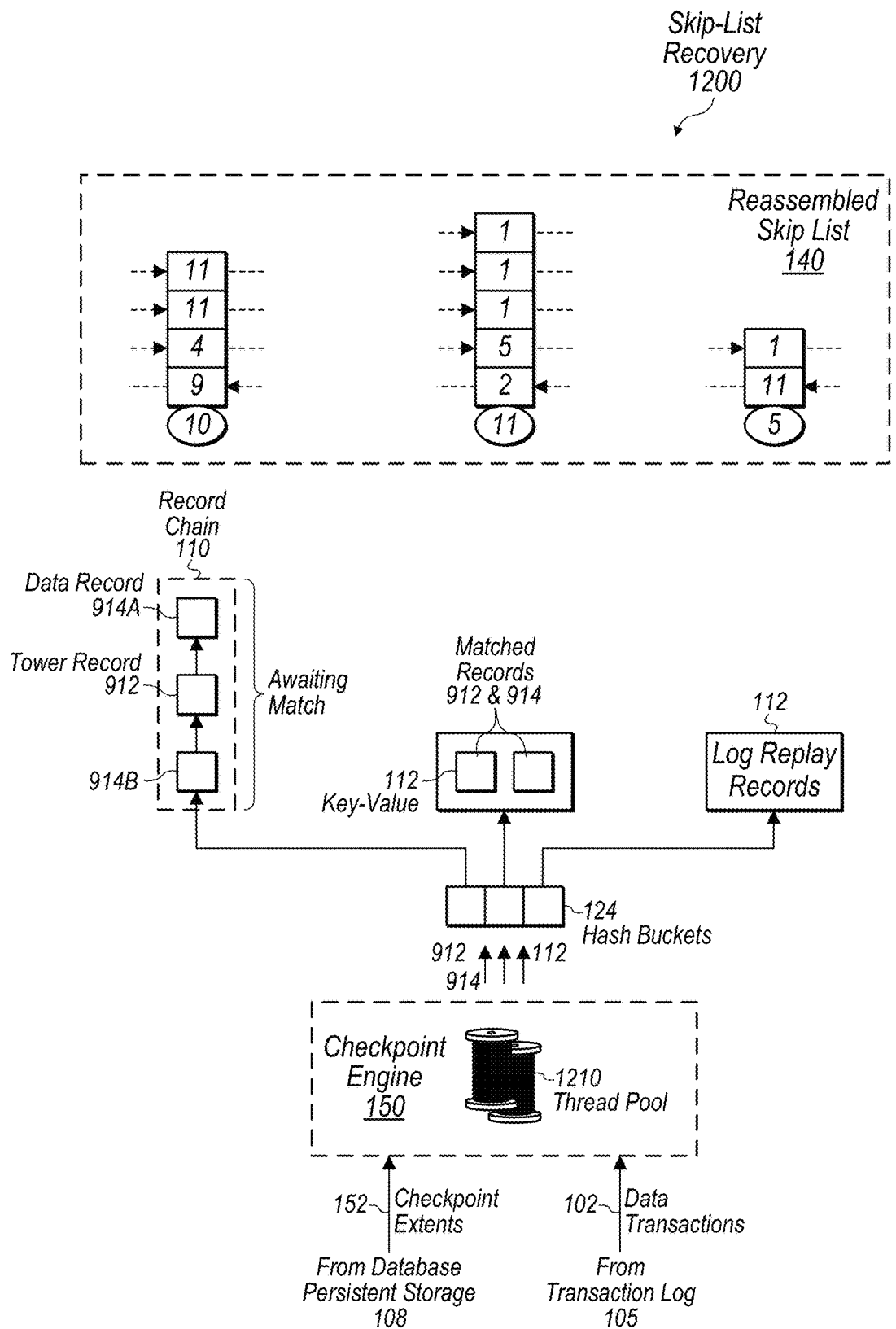
FIG. 12 is a block diagram illustrating one embodiment of a skip-list recovery.

Turning now to FIG. 12, a block diagram of a skip-list recovery 1200 is depicted. As will be discussed, in some embodiments, checkpoint engine 150 may leverage hash table 120 to facilitate the recovery of skip list 140. In other embodiments, recovery 1200 may be implemented differently.

As shown, recovery 1200 may include checkpoint engine 150 reading checkpoint extents 152 from storage 108 and reassembling skip list 140 by indexing into hash table 120 using keys 211 of records 112. In particular, engine 150 may use bucket identifiers 512 stored in records 912 and 914, which have been determined earlier by applying hash function 122 to keys 211 in order to determine the corresponding buckets 124. Based on this indexing, engine 150 may then append record 912 and 914 to record chains 110 pointed to by their corresponding hash buckets 124.

As records 912 and 914 can be inserted currently using hash table 120, checkpoint engine 150 may instantiate a thread pool 1210 that includes multiple threads executing in parallel to records 912 and 914 into reassembled skip list 140. In order to expedite insertions, checkpoint engine 150 may support threads inserting records 912 and 914 in any ordering, which may result in records 912 and 914 corresponding to different checkpoints being inserted in a different order than they were created. For example, engine 150 may append records 912 and 914 for a first key-value record 112 corresponding to a first, later checkpoint and then append records 912 and 914 for a second key-value record 112 corresponding to a second, earlier checkpoint. To account for this, checkpoint engine 150 may attempt to match records 912 and 914 once they have been appended to record chains 110—and determine the appropriate ordering for records 112 with the most current towers 500. In some embodiments, engine 150 may match records using key hashes 1122 in tower records 912 and keys 211 in data records 914. Engine 150 may also determine which pointers 514 to use for a given tower 500 by selecting those belong to latest generation identifier 214—and thus the latest checkpoint. Checkpoint engine 150 may also replay log 105 based on a record log position 702 append one or more additional records 112 for committed transactions 102 identified from the replay.

Various methods that use one or more of the techniques discussed above will now be discussed.

Figure 13A:
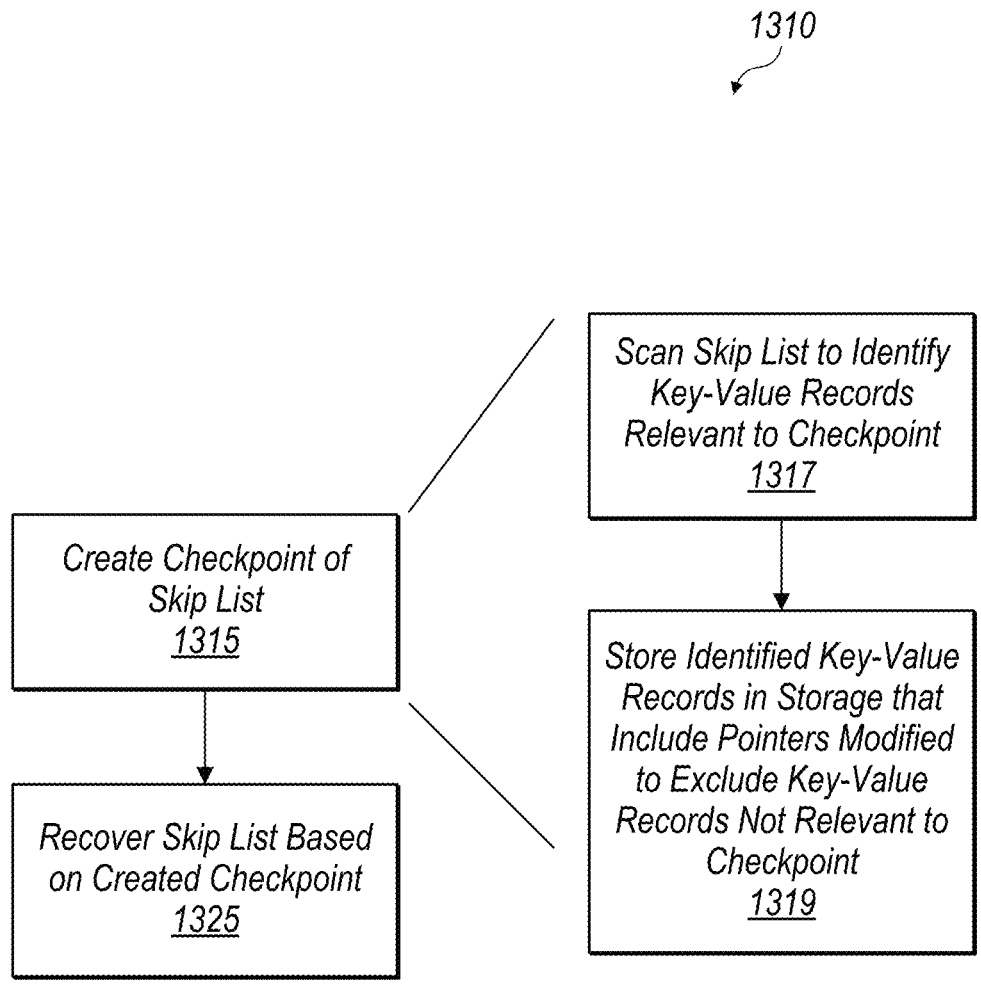
FIGS. 13A-13C are flow diagrams illustrating embodiments of methods related to checkpointing a skip list.

Turning now to FIG. 13A, a flowchart of a method 1310 for skip-list checkpointing is depicted. Method 1310 is one embodiment of a method performed by a computing system, such as database system 10, which may be executing checkpoint engine 150. In some instances, performance of method 1310 may allow for an efficient way to recover a skip list without having to rebuild it by performing multiple record insertions using a skip list traversal such as discussed above with skip list insertion 600.

In step 1315, a computing system creates a checkpoint (e.g., checkpoint 720) of a skip list (e.g., skip list 140) including a plurality of key-value records (e.g., records 112) that include pointers (e.g., skip-list pointers 218/pointers 518) to others of the plurality of key-value records. In some embodiments, a first of the plurality of key-value records in the skip list indirectly points to a second of the plurality of key-value records by including a first pointer (e.g., a bucket identifier 512) to a hash bucket (e.g., hash bucket 124) in the hash table (e.g., hash table 120), where the hash bucket includes a second pointer (e.g., direct pointer 202) to the second key-value record.

In sub-step 1317, the checkpoint creating includes the computing system scanning the skip list to identify ones (e.g., records 112 with current generation towers 500) of the plurality of key-value records that are relevant to the checkpoint. In some embodiments, the scanning further includes scanning the skip list to identify additional ones of the plurality of key-value records that belong to one or more checkpoints that are earlier than the checkpoint being created (or records that has been flushed). In some embodiments, the computing system stores generation identifiers (e.g., generation identifiers 214) in the plurality of key-value records as the plurality of key-value records are inserted into the skip list. During the scanning, the computing system compares the generation identifiers to a generation identifier associated with the checkpoint to determine whether ones of the plurality of key-value records are relevant to the checkpoint.

In sub-step 1319, the checkpoint creating includes the computing system storing the identified key-value records in a storage (e.g., database persistent storage 108). In various embodiments, the identified key-value records include pointers (e.g., pointers 514 in modified current generation tower 500B in FIG. 8A and delta tower 500E in FIG. 8B) modified to exclude ones of the plurality of key-value records that are not relevant to the checkpoint (e.g., flushed records 112 and newer generation records 112). In some embodiments, storing the identified key-value records includes storing, for a particular key-value record, a data record (e.g., data records 914) that includes a value of the particular key-value record in the storage and storing, for the particular key-value record, a separate skip-list tower record (e.g., tower records 912) that includes a skip list tower (e.g., tower 500) of pointers to others of the plurality of key-value records. In some embodiments, the computing system flushes (e.g., via a flush 710) ones of the plurality of key-value records to the storage in response to database transactions (e.g., database transactions 102) associated with the flushed key-value records committing such that the key-value records that are not relevant include the flushed key-value records. In such an embodiment, the computing system creates the checkpoint as a base checkpoint (e.g., base checkpoint 720A) that is usable to recover a version of the skip list that includes unflushed ones of the plurality of key-value records and that is usable to recover the version without using one or more additional checkpoints. In some embodiments, the computing device further determines that an insertion of a key-value record (e.g., including current generation tower 500B in FIG. 8B) associated with the checkpoint being created modified pointers in one or more of the identified additional key-value records (e.g., including delta tower 500E in FIG. 8B) belonging to the one or more earlier checkpoints. Based on the determining, the computing system storing the one or more key-value records with pointers modified responsive to the insertion. In some embodiments, the computing system creates the checkpoint as an incremental checkpoint (e.g., incremental checkpoint 720B) that is usable with the one or more earlier checkpoints to recover the skip list.

In step 1325, the computing system recovers the skip list based on the created checkpoint. In some embodiments, recovering the skip list includes the computing system reading the identified key-value records from the storage and reassembling the skip list by indexing into a hash table using keys of the read key-value records and, based on the indexing, appending the identified key-value records to record chains pointed to by hash buckets of the hash table. In some embodiments, the computing system appends a first key-value record corresponding to a first checkpoint and, before appending the first key-value record, appends a second key-value record corresponding to a second checkpoint that is created after the first checkpoint. In such an embodiment, the computing system determines to use pointers of the second key-value record for the skip list and to not use pointers of the first key-value record based on generation identifiers specified in the first and second key-value records, where the generation identifiers identify an ordering of the first and second checkpoints. In various embodiments, the recovering includes replaying a database transaction log (e.g., transaction log 105) to identify database transactions that committed after the creating of the checkpoint and, based on the replaying, inserting, into the skip list, one or more key-value records for the identified database transactions that committed after the creating of the checkpoint. In some embodiments, the computing system instantiates a thread pool (e.g., thread pool 1210) that includes a plurality of threads executing in parallel to insert key-value records into the reassembled skip list.

Figure 13B:
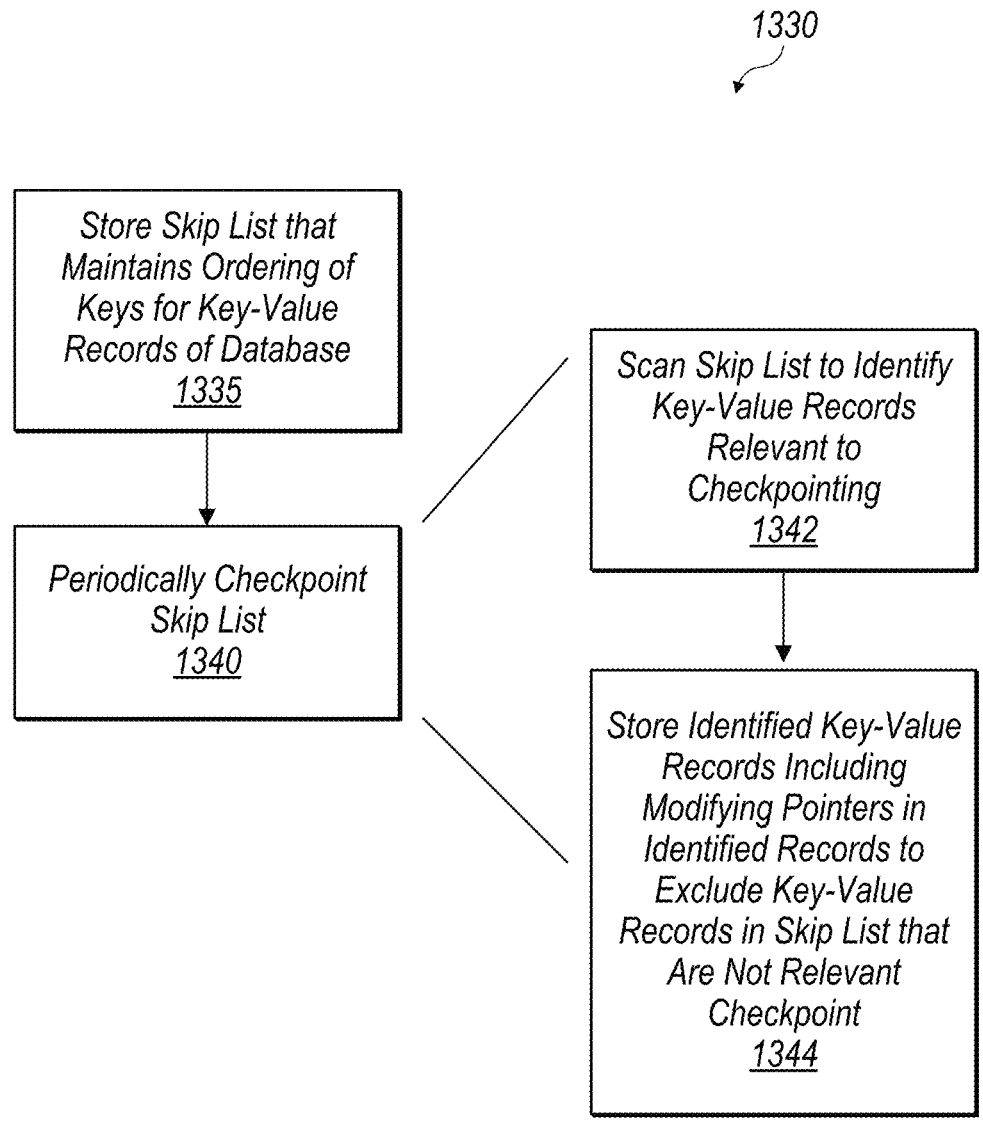

Turning now to FIG. 13B, a flowchart of another method 1330 for skip-list checkpointing is depicted. Method 1330 is another embodiment of a method performed by a computing system, such as database system 10, which may be executing checkpoint engine 150. In many instances, performance of method 1330 may provide a more efficient way to back up a skip list than periodically copying the entire skip list to a storage.

In step 1335, the computing system stores, in a memory (e.g., a volatile memory), a skip list (e.g., skip list 140) that maintains an ordering of keys (e.g., keys 211) for key-value records (e.g., records 112) of a database.

In step 1340, the computing system periodically checkpointing the skip list.

In sub-step 1342, the checkpointing includes the computing system scanning the skip list to identify key-value records (e.g., records 112 with current generation towers 500) that are relevant to the checkpointing. In some embodiments, the scanning includes comparing generation identifiers (e.g., generation identifiers 214) stored in the key-value records with a generation identifier associated with the checkpointing to determine whether ones of the key-value records are relevant to the checkpointing. In various embodiments, method 1330 includes flushing ones of the key-value records to the storage in response to database transactions associated with the flushed key-value records committing. In one such embodiment, the key-value records identified as relevant do not include the flushed key-value records. In some embodiments, the checkpointing includes creating a base checkpoint (e.g., base checkpoint 720A) of the skip list in conjunction with the flushing and one or more incremental checkpoints (e.g., incremental checkpoints 720B-D) after the flushing and prior to a subsequent flushing.

In sub-step 1344, the checkpointing includes storing the identified key-value records in a storage (e.g., database persistent storage 108) of the database that is distinct from the memory. In various embodiments, the storing includes the computing system modifying pointers (e.g., pointers 514 in modified current generation tower 500B in FIG. 8B and delta tower 500E in FIG. 8B) in the stored records to exclude key-value records (e.g., flushed records 112 and newer generation records 112) in the skip list that are not relevant to the checkpoint.

In some embodiments, method 1330 further includes, in response to the skip list in the memory being corrupted, the computing system restoring the skip list in the memory based on the checkpointing. In some embodiments, the restoring includes restoring multiple portions of the skip list in parallel.

Figure 13C:
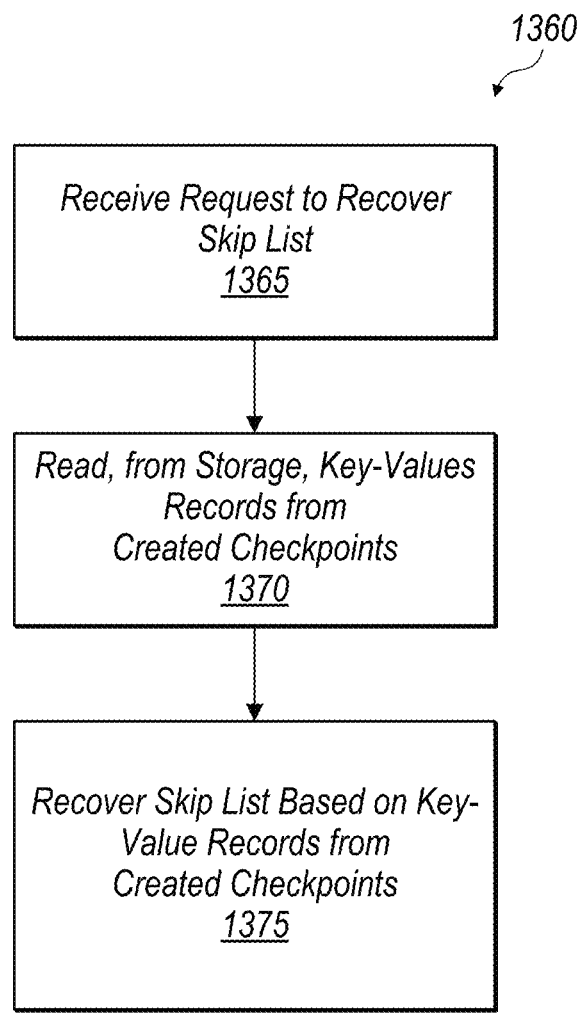

Turning now to FIG. 13C, a flowchart of a method 1360 for skip-list recovery is depicted. Method 1360 is another embodiment of a method performed by a computing system, such as database system 10, which may be executing checkpoint engine 150. In some instances, performance of method 1360 may quicker recovery of a skip list that rebuilding a skip list from scratch.

In step 1365, the computing system receives a request to recover a skip list (e.g., skip list 140) including a plurality of key-value records (e.g., records 112) that include pointers (e.g., pointers 218) to others of the plurality of key-value records. Such a request may be received from, for example, an administrator, software that has detected a problem with the skip, another computing system, etc.

In step 1370, the computing system reads, from a storage (e.g., database persistent storage 108), key-value records (e.g., in checkpoint extents 152) from one or more created checkpoints (e.g., checkpoints 720). In various embodiments, the read key-value records include key-value records with modified pointers (e.g., modified current generation tower 500B in FIG. 8A and delta tower 500E in FIG. 8B) to exclude key-value records (e.g., flushed records 112 and newer generation records 112) that were not relevant to the one or more checkpoints.

In step 1375, the computing system recovers the skip list based on the read key-value records from the one or more created checkpoints. In some embodiments, the recovering includes indexing into a hash table (e.g., hash table 120)

using keys (e.g., keys 211) of the read key-value records and, based on the indexing, appending the read key-value records to record chains (e.g., record chains 110) pointed to by hash buckets of the hash table. In some embodiments, the recovering includes instantiating a plurality of threads (e.g., thread pool 1210) executable to recover portions of the skip list in parallel. In various embodiments, the recovering includes replaying a database transaction log (e.g., transaction log 105) to identify database transactions that committed after creating of the one or more checkpoints and inserting, into the skip list, one or more key-value records identified based on the replaying.

In some embodiments, method 1360 further includes creating a base checkpoint (e.g., base checkpoint 720A) of the skip list in conjunction with performing a flush of ones of the plurality of key-value records to a storage and, prior to performing a subsequent flush of ones of the plurality of key-value records, creating one or more incremental checkpoints (e.g., incremental checkpoints 720B-D) of the skip list that are usable in conjunction with the base checkpoint to recover the skip list.

Exemplary Multi-Tenant Database System

Figure 14:
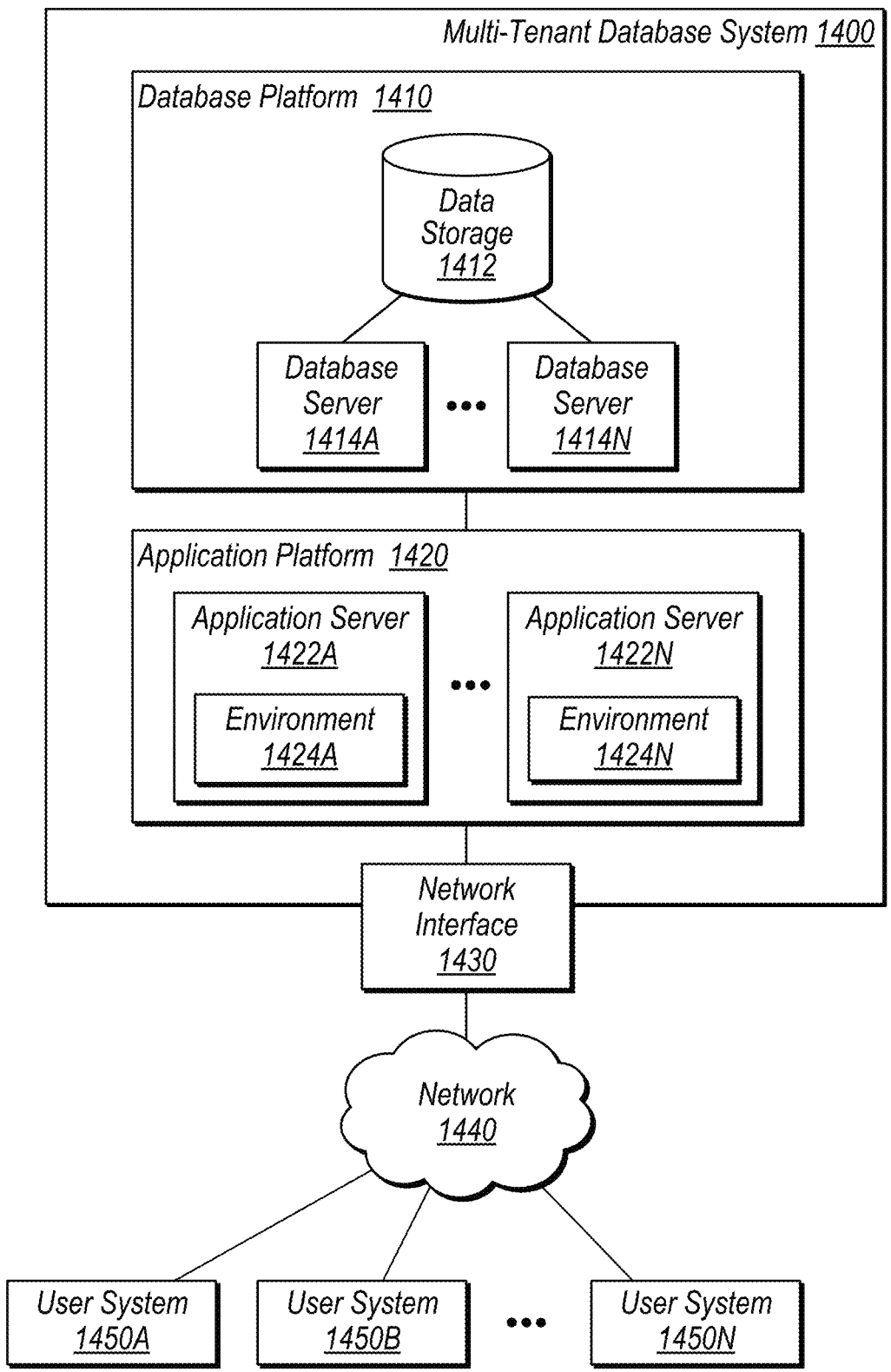
FIG. 14 is a block diagram illustrating one embodiment of an exemplary multi-tenant system.

Turning now to FIG. 14, an exemplary multi-tenant database system (MTS) 1400, which may implement functionality of as database system 10, is depicted. In the illustrated embodiment, MTS 1400 includes a database platform 1410, an application platform 1420, and a network interface 1430 connected to a network 1440. Database platform 1410 includes a data storage 1412 and a set of database servers 1414A-N that interact with data storage 1412, and application platform 1420 includes a set of application servers 1422A-N having respective environments 1424. In the illustrated embodiment, MTS 1400 is connected to various user systems 1450A-N through network 1440. In other embodiments, techniques of this disclosure are implemented in non-multi-tenant environments such as client/server environments, cloud computing environments, clustered computers, etc.

MTS 1400, in various embodiments, is a set of computer systems that together provide various services to users (alternatively referred to as "tenants") that interact with MTS 1400. In some embodiments, MTS 1400 implements a customer relationship management (CRM) system that provides mechanism for tenants (e.g., companies, government bodies, etc.) to manage their relationships and interactions with customers and potential customers. For example, MTS 1400 might enable tenants to store customer contact information (e.g., a customer's website, email address, telephone number, and social media data), identify sales opportunities, record service issues, and manage marketing campaigns. Furthermore, MTS 1400 may enable those tenants to identify how customers have been communicated with, what the customers have bought, when the customers last purchased items, and what the customers paid. To provide the services of a CRM system and/or other services, as shown, MTS 1400 includes a database platform 1410 and an application platform 1420.

Database platform 1410, in various embodiments, is a combination of hardware elements and software routines that implement database services for storing and managing data of MTS 1400, including tenant data. As shown, database platform 1410 includes data storage 1412. Data storage 1412, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 1412 is used to implement a database persistent storage 108 comprising a collection of information that is organized in a way that allows for access, storage, and manipulation of the information. Data storage 1412 may implement a single database, a distributed database, a collection of distributed databases, a database with redundant online or offline backups or other redundancies, etc. As part of implementing the database, data storage 1412 may store one or more database records 112 having respective data payloads (e.g., values for fields of a database table) and metadata (e.g., a key value, timestamp, table identifier of the table associated with the record, tenant identifier of the tenant associated with the record, etc.).

In various embodiments, a database record 112 may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 1400 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 1412 includes buffer data structure 106 and database persistent storage 108 organized as part of a log-structured merge-tree (LSM tree). As noted above, a database server 1414 may initially write database records into a local in-memory buffer data structure 106 before later flushing those records to the persistent storage (e.g., in data storage 1412). As part of flushing database records, the database server 1414 may write the database records 112 into new files that are included in a "top" level of the LSM tree. Over time, the database records may be rewritten by database servers 1414 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 1412.

When a database server 1414 wishes to access a database record for a particular key, the database server 1414 may traverse the different levels of the LSM tree for files that potentially include a database record for that particular key 211. If the database server 1414 determines that a file may include a relevant database record, the database server 1414 may fetch the file from data storage 1412 into a memory of the database server 1414. The database server 1414 may then check the fetched file for a database record 112 having the particular key 211. In various embodiments, database records 112 are immutable once written to data storage 1412. Accordingly, if the database server 1414 wishes to modify the value of a row of a table (which may be identified from the accessed database record), the database server 1414 writes out a new database record 112 into buffer data structure 106, which is purged to the top level of the LSM tree. Over time, that database record 112 is merged down the levels of the LSM tree. Accordingly, the LSM tree may store various database records 112 for a database key 211 where the older database records 112 for that key 211 are located in lower levels of the LSM tree then newer database records.

Database servers 1414, in various embodiments, are hardware elements, software routines, or a combination thereof capable of providing database services, such as data storage, data retrieval, and/or data manipulation. Such database services may be provided by database servers 1414 to components (e.g., application servers 1422) within MTS 1400 and to components external to MTS 1400. As an example, a database server 1414 may receive a database transaction request from an application server 1422 that is requesting data to be written to or read from data storage 1412. The database transaction request may specify an SQL SELECT command to select one or more rows from one or more database tables. The contents of a row may be defined in a database record and thus database server 1414 may locate and return one or more database records that correspond to the selected one or more table rows. In various cases, the database transaction request may instruct database server 1414 to write one or more database records for the LSM tree—database servers 1414 maintain the LSM tree implemented on database platform 1410. In some embodiments, database servers 1414 implement a relational database management system (RDMS) or object-oriented database management system (OODBMS) that facilitates storage and retrieval of information against data storage 1412. In various cases, database servers 1414 may communicate with each other to facilitate the processing of transactions. For example, database server 1414A may communicate with database server 1414N to determine if database server 1414N has written a database record into its in-memory buffer for a particular key.

Application platform 1420, in various embodiments, is a combination of hardware elements and software routines that implement and execute CRM software applications as well as provide related data, code, forms, web pages and other information to and from user systems 1450 and store related data, objects, web page content, and other tenant information via database platform 1410. In order to facilitate these services, in various embodiments, application platform 1420 communicates with database platform 1410 to store, access, and manipulate data. In some instances, application platform 1420 may communicate with database platform 1410 via different network connections. For example, one application server 1422 may be coupled via a local area network and another application server 1422 may be coupled via a direct network link. Transfer Control Protocol and Internet Protocol (TCP/IP) are exemplary protocols for communicating between application platform 1420 and database platform 1410, however, it will be apparent to those skilled in the art that other transport protocols may be used depending on the network interconnect used.

Application servers 1422, in various embodiments, are hardware elements, software routines, or a combination thereof capable of providing services of application platform 1420, including processing requests received from tenants of MTS 1400. Application servers 1422, in various embodiments, can spawn environments 1424 that are usable for various purposes, such as providing functionality for developers to develop, execute, and manage applications. Data may be transferred into an environment 1424 from another environment 1424 and/or from database platform 1410. In some cases, environments 1424 cannot access data from other environments 1424 unless such data is expressly shared. In some embodiments, multiple environments 1424 can be associated with a single tenant.

Application platform 1420 may provide user systems 1450 access to multiple, different hosted (standard and/or custom) applications, including a CRM application and/or applications developed by tenants. In various embodiments, application platform 1420 may manage creation of the applications, testing of the applications, storage of the applications into database objects at data storage 1412, execution of the applications in an environment 1424 (e.g., a virtual machine of a process space), or any combination thereof. In some embodiments, application platform 1420 may add and remove application servers 1422 from a server pool at any time for any reason, there may be no server affinity for a user and/or organization to a specific application server 1422. In some embodiments, an interface system (not shown) implementing a load balancing function (e.g., an F5 Big-IP load balancer) is located between the application servers 1422 and the user systems 1450 and is configured to distribute requests to the application servers 1422. In some embodiments, the load balancer uses a least connections algorithm to route user requests to the application servers 1422. Other examples of load balancing algorithms, such as are round robin and observed response time, also can be used. For example, in certain embodiments, three consecutive requests from the same user could hit three different servers 1422, and three requests from different users could hit the same server 1422.

In some embodiments, MTS 1400 provides security mechanisms, such as encryption, to keep each tenant's data separate unless the data is shared. If more than one server 1414 or 1422 is used, they may be located in close proximity to one another (e.g., in a server farm located in a single building or campus), or they may be distributed at locations remote from one another (e.g., one or more servers 1414 located in city A and one or more servers 1422 located in city B). Accordingly, MTS 1400 may include one or more logically and/or physically connected servers distributed locally or across one or more geographic locations.

One or more users (e.g., via user systems 1450) may interact with MTS 1400 via network 1440. User system 1450 may correspond to, for example, a tenant of MTS 1400, a provider (e.g., an administrator) of MTS 1400, or a third party. Each user system 1450 may be a desktop personal computer, workstation, laptop, PDA, cell phone, or any Wireless Access Protocol (WAP) enabled device or any other computing device capable of interfacing directly or indirectly to the Internet or other network connection. User system 1450 may include dedicated hardware configured to interface with MTS 1400 over network 1440. User system 1450 may execute a graphical user interface (GUI) corresponding to MTS 1400, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 1450 to access, process, and view information and pages available to it from MTS 1400 over network 1440. Each user system 1450 may include one or more user interface devices, such as a keyboard, a mouse, touch screen, pen or the like, for interacting with a graphical user interface (GUI) provided by the browser on a display monitor screen, LCD display, etc.

in conjunction with pages, forms and other information provided by MTS 1400 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 1450 may be users in differing capacities, the capacity of a particular user system 1450 might be determined one or more permission levels associated with the current user. For example, when a salesperson is using a particular user system 1450 to interact with MTS 1400, that user system 1450 may have capacities (e.g., user privileges) allotted to that salesperson. But when an administrator is using the same user system 1450 to interact with MTS 1400, the user system 1450 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 1400 that are allocated at the tenant level while other data structures are managed at the user level.

In some embodiments, a user system 1450 and its components are configurable using applications, such as a browser, that include computer code executable on one or more processing elements. Similarly, in some embodiments, MTS 1400 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 1440 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 1450 may communicate with MTS 1400 using TCP/IP and, at a higher network level, use other common Internet protocols to communicate, such as HTTP, FTP, AFS, WAP, etc. For example, where HTTP is used, user system 1450 might include an HTTP client commonly referred to as a "browser" for sending and receiving HTTP messages from an HTTP server at MTS 1400. Such a server might be implemented as the sole network interface between MTS 1400 and network 1440, but other techniques might be used as well or instead. In some implementations, the interface between MTS 1400 and network 1440 includes load sharing functionality, such as round-robin HTTP request distributors to balance loads and distribute incoming HTTP requests evenly over a plurality of servers.

In various embodiments, user systems 1450 communicate with application servers 1422 to request and update system-level and tenant-level data from MTS 1400 that may require one or more queries to data storage 1412. In some embodiments, MTS 1400 automatically generates one or more SQL statements (the SQL query) designed to access the desired information. In some cases, user systems 1450 may generate requests having a specific format corresponding to at least a portion of MTS 1400. As an example, user systems 1450 may request to move data objects into a particular environment 1424 using an object notation that describes an object relationship mapping (e.g., a JavaScript object notation mapping) of the specified plurality of objects.

Exemplary Computer System

Figure 15:
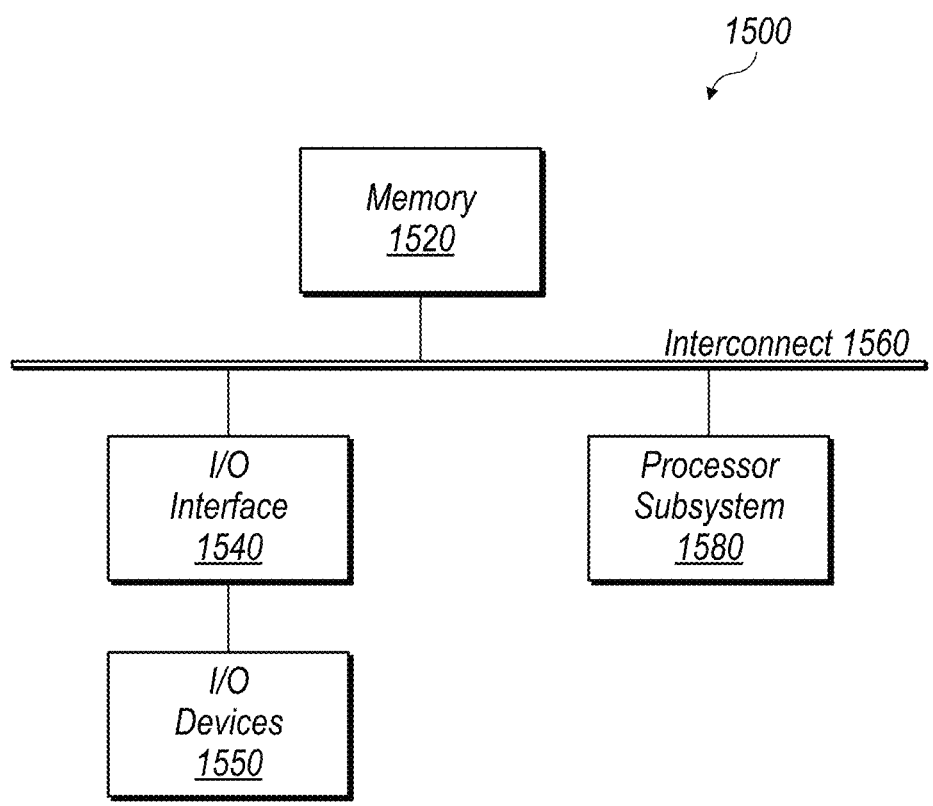
FIG. 15 is a block diagram illustrating one embodiment of an exemplary computer system for implementing various systems described herein.

Turning now to FIG. 15, a block diagram of an exemplary computer system 1500, which may implement functionality described herein, such as database system 10, a portion of database system 10, or a client interacting with database system 10, is depicted. Computer system 1500 includes a processor subsystem 1580 that is coupled to a system memory 1520 and I/O interfaces(s) 1540 via an interconnect 1560 (e.g., a system bus). I/O interface(s) 1540 is coupled to one or more I/O devices 1550. Computer system 1500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1500 is shown in FIG. 15 for convenience, system 1500 may also be implemented as two or more computer systems operating together in a cluster.

Processor subsystem 1580 may include one or more processors or processing units. In various embodiments of computer system 1500, multiple instances of processor subsystem 1580 may be coupled to interconnect 1560. In various embodiments, processor subsystem 1580 (or each processor unit within 1580) may contain a cache or other form of on-board memory.

System memory 1520 is usable store program instructions executable by processor subsystem 1580 to cause system 1500 perform various operations described herein. System memory 1520 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1500 is not limited to primary storage such as memory 1520. Rather, computer system 1500 may also include other forms of storage such as cache memory in processor subsystem 1580 and secondary storage on I/O Devices 1550 (e.g., a hard drive, storage array, etc.). In some embodiments, these other forms of storage may also store program instructions executable by processor subsystem 1580 to cause system 1500 to perform operations described herein. In some embodiments, memory 1520 may include transaction manager 104, checkpoint engine 150, buffer data structure 106, and/or portions of database persistent storage 108.

I/O interfaces 1540 may be any of various types of interfaces configured to couple to and communicate with other devices, according to various embodiments. In one embodiment, I/O interface 1540 is a bridge chip (e.g., Southbridge) from a front-side to one or more back-side buses. I/O interfaces 1540 may be coupled to one or more I/O devices 1550 via one or more corresponding buses or other interfaces. Examples of I/O devices 1550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1500 is coupled to a network via a network interface device 1550 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A non-transitory computer readable medium having program instructions stored thereon that are capable of causing a computing system to implement operations comprising:
   creating a backup of a skip list including a plurality of key-value records that include pointers arranged in towers to others of the plurality of key-value records, wherein creating the backup includes:
      scanning the skip list to identify ones of the plurality of key-value records that are relevant to the backup; and
      storing the identified key-value records in a storage, wherein the identified key-value records include pointers modified to exclude ones of the plurality of key-value records that are not relevant to the backup; and
   recovering the skip list based on the created backup.

2. The computer readable medium of claim 1, wherein the operations further comprise:
   flushing ones of the plurality of key-value records to the storage in response to database transactions associated with the flushed key-value records committing, wherein the key-value records that are not relevant include the flushed key-value records; and creating the backup as a base backup that is usable to recover a version of the skip list that includes unflushed ones of the plurality of key-value records and that is usable to recover the version without using one or more additional backups.

3. The computer readable medium of claim 1, wherein creating the backup includes:

scanning the skip list to identify additional ones of the plurality of key-value records that belong to one or more backups that are earlier than the backup being created;

determining that an insertion of a key-value record associated with the backup being created modified pointers in one or more of the identified additional key-value records belonging to the one or more earlier backups;

based on the determining, storing the one or more key-value records with pointers modified responsive to the insertion; and creating the backup as an incremental backup that is usable with the one or more earlier backups to recover the skip list.

4. The computer readable medium of claim 1, wherein recovering the skip list includes:

replaying a database transaction log to identify database transactions that committed after the creating of the backup; and based on the replaying, inserting, into the skip list, one or more key-value records for the identified database transactions that committed after the creating of the backup.

5. The computer readable medium of claim 1, wherein the operations further comprise:

storing generation identifiers in the plurality of key-value records as the plurality of key-value records are inserted into the skip list; and during the scanning, comparing the generation identifiers to a generation identifier associated with the backup to determine whether ones of the plurality of key-value records are relevant to the backup.

6. The computer readable medium of claim 1, wherein recovering the skip list includes:

reading the identified key-value records from the storage; reassembling the skip list by:

indexing into a hash table using keys of the read key-value records; and based on the indexing, appending the identified key-value records to record chains pointed to by hash buckets of the hash table.

7. The computer readable medium of claim 6, wherein a first of the plurality of key-value records in the skip list indirectly points to a second of the plurality of key-value records by including a first pointer to a hash bucket in the hash table, wherein the hash bucket includes a second pointer to the second key-value record.

8. The computer readable medium of claim 6, wherein reassembling the skip list includes:

appending a first key-value record corresponding to a first backup;

before appending the first key-value record, appending a second key-value record corresponding to a second backup that is created after the first backup; and determining to use pointers of the second key-value record for the skip list and to not use pointers of the first key-value record based on generation identifiers specified in the first and second key-value records, wherein the generation identifiers identify an ordering of the first and second backups.

9. The computer readable medium of claim 6, wherein the operations further comprise:

instantiating a thread pool that includes a plurality of threads executing in parallel to insert key-value records into the reassembled skip list.

10. The computer readable medium of claim 1, wherein storing the identified key-value records includes:

storing, for a particular key-value record, a data record that includes a value of the particular key-value record in the storage; and storing, for the particular key-value record, a separate skip-list tower record that includes a skip list tower of pointers to others of the plurality of key-value records.

11. A method, comprising:

storing, by a computing system in a memory, a skip list that maintains an ordering of keys for key-value records of a database, wherein the key-value records include pointers arranged in towers to others of the key-value records;

periodically, by the computing system, creating a backup of the skip list, wherein the creating includes:

scanning the skip list to identify key-value records that are relevant to the backup; and storing the identified key-value records in a storage of the database that is distinct from the memory, wherein the storing includes:

modifying pointers in the stored records to exclude key-value records in the skip list that are not relevant to the backup; and in response to the skip list in the memory being corrupted, restoring, by the computing system, the skip list in the memory based on the backup.

12. The method of claim 11, wherein the scanning includes:

comparing generation identifiers stored in the key-value records with a generation identifier associated with the backup to determine whether ones of the key-value records are relevant to the backup.

13. The method of claim 11, further comprising:

flushing key-value records to the storage in response to database transactions committing, wherein the key-value records relevant to the backup do not include the flushed key-value records.

14. The method of claim 13, wherein the creating includes:

creating a base backup of the skip list in conjunction with the flushing and one or more incremental backups after the flushing and prior to a subsequent flushing.

15. The method of claim 11, wherein the restoring includes restoring multiple portions of the skip list in parallel.

16. A computing system, comprising:

one or more processors; and memory having program instructions stored thereon that are capable of causing the computing system to implement operations comprising:

receiving a request to recover a skip list including a plurality of key-value records that include pointers arranged in towers to others of the plurality of key-value records;

reading, from a storage, key-value records from one or more created backups, wherein the read key-value records include key-value records with modified pointers to exclude key-value records that were not relevant to the one or more backups; and recovering the skip list based on the read key-value records from the one or more created backups.

17. The computing system of claim 16, wherein the recovering includes:

indexing into a hash table using keys of the read key-value records; and based on the indexing, appending the read key-value records to record chains pointed to by hash buckets of the hash table.

18. The computing system of claim 16, wherein the recovering includes:

instantiating a plurality of threads executable to recover portions of the skip list in parallel.

19. The computing system of claim 16, wherein the recovering includes:

replaying a database transaction log to identify database transactions that committed after creating of the one or more backups; and inserting, into the skip list, one or more key-value records identified based on the replaying.

20. The computing system of claim 16, wherein the operations further comprise:

creating a base backup of the skip list in conjunction with performing a flush of ones of the plurality of key-value records to a storage; and prior to performing a subsequent flush of ones of the plurality of key-value records, creating one or more incremental backups of the skip list that are usable in conjunction with the base backups to recover the skip list.

* * * * *